US008958608B2

(12) United States Patent
Santos-Villalobos et al.

(10) Patent No.: US 8,958,608 B2
(45) Date of Patent: Feb. 17, 2015

(54) FRONTAL VIEW RECONSTRUCTION FOR IRIS RECOGNITION

(71) Applicant: UT-Battelle, LLC, Oak Ridge, TN (US)

(72) Inventors: Hector J. Santos-Villalobos, Knoxville, TN (US); David S. Bolme, Knoxville, TN (US); Chris Bensing Boehnen, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 45 days.

(21) Appl. No.: 13/910,069

(22) Filed: Jun. 4, 2013

(65) Prior Publication Data
US 2014/0355841 A1 Dec. 4, 2014

(51) Int. Cl.
G06K 9/00 (2006.01)
G06T 5/00 (2006.01)

(52) U.S. Cl.
CPC .............. *G06K 9/0061* (2013.01); *G06T 5/006* (2013.01)
USPC ........................................................ 382/117

(58) Field of Classification Search
CPC ........................ G06K 9/00597; G06K 9/00617
USPC ........................................ 382/115, 117, 248
See application file for complete search history.

(56) References Cited

U.S. PATENT DOCUMENTS

| | | | |
|---|---|---|---|
| 4,641,349 A | 2/1987 | Flom et al. | |
| 6,714,665 B1 | 3/2004 | Hanna et al. | |
| 7,433,807 B2 | 10/2008 | Marschner et al. | |
| 8,050,463 B2 | 11/2011 | Hamza | |
| 8,098,901 B2 | 1/2012 | Hamza | |
| 8,144,208 B2 | 3/2012 | Silveira et al. | |
| 8,824,779 B1 * | 9/2014 | Smyth ........................... | 382/154 |
| 2008/0075334 A1 | 3/2008 | Determan et al. | |
| 2012/0140992 A1 | 6/2012 | Du et al. | |

FOREIGN PATENT DOCUMENTS

KR   1020110078468 A   7/2011

OTHER PUBLICATIONS

"About the Technology," NeoFilter Labs, Technology Discussion, visited Mar. 26, 2013, 1 page.
"All About Aspheric Lenses," Edmund Optics Inc. website Learning & Support, visited May 2, 2013, 5 pages.
"Iris Scan," *Wikipedia*, visited Mar. 24, 2013, 11 pages.
About us, Fulcrum Biometrics, visited Mar. 12, 2013, 1 page.
Almedia et al., "Different Schematic Eyes and Their Accuracy to the In Vivo Eye: A Quantitative Comparison Study," *Brazilian Journal of Physics*, 37(2a) 2007, pp. 378-387.
Bolme et al., "PyVision—Computer Vision Toolkit," http://pyvision.sourceforge.net, 2008, 3 pages.

(Continued)

*Primary Examiner* — Brian Le
(74) *Attorney, Agent, or Firm* — Klarquist Sparkman, LLP

(57) ABSTRACT

Iris recognition can be accomplished for a wide variety of eye images by correcting input images with an off-angle gaze. A variety of techniques, from limbus modeling, corneal refraction modeling, optical flows, and genetic algorithms can be used. A variety of techniques, including aspherical eye modeling, corneal refraction modeling, ray tracing, and the like can be employed. Precomputed transforms can enhance performance for use in commercial applications. With application of the technologies, images with significantly unfavorable gaze angles can be successfully recognized.

21 Claims, 39 Drawing Sheets

(56) References Cited

OTHER PUBLICATIONS

Bonney et al., "Iris Pattern Extraction Using Bit Planes and Standard Deviations," In *Signals, Systems and Computers, 2004, Conference Record of the Thirty-Eighth Asilomar Conference on*, vol. 1, IEEE, Nov. 2004, pp. 582-586.

Bowyer et al., "Image Understanding for Iris Biometrics: A Survey," *Computer Vision and Image Understanding*, 110(2) 2008, pp. 281-307.

Buck, Download Tree for "POV-Ray—The persistence of vision raytracer," http://www.povray.org/, visited Jan. 24, 2014, showing Aug. 2009 date for version 3.6, 1 page.

Buck, "What's new in POV-Ray 3.6," htpp://www.povray.org/, Aug. 2009, 2 pages.

Buck, POV-Ray, version 3.6 "Download" page, http://www.povray.org/, Aug. 2009, 2 pages.

Chou et al., "Non-Orthogonal View Iris Recognition System," *Circuits and Systems for Video Technology, IEEE Transactions on*, 20(3) Mar. 2010, pp. 417-430.

Daugman, "High Confidence Visual Recognition of Persons by a Test of Statistical Independence," *Pattern Analysis and Machine Intelligence, IEEE Transactions on*, 15(11), Nov. 1993, pp. 1148-1161.

Daugman, "How Iris Recognition Works," *Circuits and Systems for Video Technology, IEEE Transactions on*, 14(1), Jan. 30, 2004, pp. 21-30.

Daugman, "New Methods in Iris Recognition," *Systems, Man, and Cybernetics, Part B: Cybermetrics, IEEE Transactions on*, 37(5), Oct. 2007, pp. 1167-1175.

Daugman, "Probing the Uniqueness and Randomness of Iriscodes: Results From 200 Billion Iris Pair Comparisons," *Proceedings of the IEEE*, 94(11), Nov. 2006, pp. 1927-1935.

Fitzgibbon et al., "Direct Least Square Fitting of Ellipses," *IEEE Transactions on Pattern Analysis and Machine Intelligence, IEEE Transactions on*, 21(5) May 1999, pp. 476-480.

Francois et al., "Image-Based Modeling of the Human Eye," *Visualization and Computer Graphics, IEEE Transactions on*, 15(5), Sep. 2009, pp. 815-827.

Frigerio et al., "Correction Method for Nonideal Iris Recognition," *19$^{th}$ IEEE International Conference on Image Processing (ICIP)*, Sep. 30-Oct. 3, 2012, pp. 1149-1152.

Le Grand, "Form and Space Vision," Book review, Indiana University Press, 1967, 1 page.

Grother et al., "IREX III: Performance of iris identification algorithms," 2012, 103 pages.

Hashemi et al., "Changes in Corneal Thickness, Curvature, and Anterior Chamber Depth During the Menstrual Cycle," *Canadian Journal of Ophthalmology/Journal Canadien d'Ophtalmologie*, 45(1), 2010, pp. 67-70.

Hu et al., "Iterative Directional Ray-based Iris Segmentation for Challenging Periocular Images," *Biometric Recognition*, Springer Berlin Heidelberg, 2011, 9 pages.

I Scan 2, Dual Iris Capture Scanner, CrossMatch Technologies brochure, Jan. 2012, 1 page.

IriShield—Superior iris recognition in a secure chip, Iritech, Inc., Oct. 2012, 7 pages.

Karakaya et al., "Gaze estimation for off-angle iris recognition based on the biometric eye model," Proc. Of SPIE, vol. 8712, Biometric and Surveillance Technology for Human and Activity Identification X, 87120F, May 31, 2013, 9 pages.

Kennell et al., "Preprocessing of Off-Axis Iris Images for Recognition," In *SPIE Europe Security and Defence*, International Society for Optics and Photonics, 2008, p. 711906, 9 pages.

Krichen et al., "Osiris (open source for iris) reference system," BioSecure Project, http://www.biosecure,info, 2008, 25 pages.

Li et al., "Iris recognition in non-ideal imaging conditions," *Pattern Recognition Letters*, 33(8), Jun. 2012, pp. 1012-1018.

Liou et al., "Anatomically Accurate, Finite Model Eye for Optical Modeling," *J. Opt. Soc. Am. A.*, 14(8), Aug. 1997, pp. 1684-1695.

Marcon et al., "Sclera Segmentation for Gaze Estimation and Iris Localization in Unconstrained Images," *Computational Modeling of Objects Represented in Images: Fundamentals, Methods and Applications III*, Aug. 28, 2012, pp. 25-30.

Matey et al., "Iris on the Move: Acquisition of Images for Iris Recognition in Less Constrained Environments," *Proceedings of the IEEE*, 94(11), Nov. 2006, pp. 1936-1947.

Mei et al., "Novel Approaches to Improve Robustness, Accuracy and Rapidity of Iris Recognition Systems," *Industrial Informatics, IEEE Transactions on*, 8(1), Feb. 2012, pp. 110-117.

Navarro et al., "Optics of the Average Normal Cornea From General and Canonical Representations of Its Surface Topography," *J. Opt. Soc. Am. A.*, 23(2), Feb. 2006, pp. 219-232.

NEUROtechnology, Core Technology for Your Application, Feb. 5, 2013, 12 pages.

NEUROtechnology, Iris Identification for PC and Web solutions, Apr. 23, 2012, 18 pages.

Price et al., "On the Efficacy of Correcting for Refractive Effect in Iris Recognition," Computer Visions and Pattern Recognition, Jun. 2007, CVPR '07, IEEE Conference on, pp. 1-6.

Proenca et al., "Toward Noncooperative Iris Recognition: A Classification Approach Using Multiple Signatures," *Pattern Analysis and Machine Intelligence, IEEE Transactions on*, 29(4), Apr. 2007, pp. 607-612.

Pundlik et al., "Non-Ideal Iris Segmentation Using Graph Cuts," in *Computer, Vision and Pattern Recognition Workshops, 2008, CVPRW '08, IEEE Computer Society Conference on*, Jun. 2008, pp. 1-6.

Rahulkar et al., "Half-Iris Feature Extraction and Recognition Using a New Class of Biorthogonal Triplet Half-Brand Filter and Flexible k-out-of-n: A Postclassifier," *Information Forensics and Security, IEEE Transactions on*, 7(1), Feb. 2012, pp. 230-240.

Ryan et al., "Adapting Starburst for Elliptical Iris Segmentation," *Biometrics: Theory, Applications and Systems, 2008 BTAS, 2IEEE International Conference on*, IEEE 2008, 7 pages.

Santos-Villalobos et al., "ORNL Biometric Eye Model for Iris Recognition," *2012 Fifth IEEE International Conference on Biometrics: Theory Applications and Systems (BTAS)*, Sep. 26, 2012, pp. 176-182, 7 pages.

Sanz et al., "Off-Axis Aberrations of a Wide-Angle Schematic Eye Model," *J. Opt. Soc. Am. A.* 16(8) Aug. 1999, pp. 1881-1891.

Schuckers et al., "On Techniques for Angle Compensation in Nonideal Iris Recognition," *Systems, Man and Cybernetics, Part B: Cybernetics, IEEE Transactions on*, 37(5) Oct. 2007, pp. 1176-1190.

VeriEye eye iris identification technology, algorithm and SDK for PC and Web. 5-Brochure, May 10, 2013, 18 pages.

Vurgese et al., "Scleral Thickness in Human Eyes," *PloS one*, 7(1):e29692, Jan. 2012, 9 pages.

Wecker et al., "A Multiresolution Approach to Iris Synthesis," *Computers and Graphics*, 34(4), 2010, pp. 468-478.

Whitley et al., "Genitor II: A Distributed Genetic Algorithm," *Journal of Experimental and Theoretical Artificial Intelligence*, 1990, vol. 2, No. 3, pp. 189-214.

Woodard et al., "On the Fusion of Periocular and Iris Biometrics in Non-Ideal Imagery," In *Pattern Recognition (ICPR), 2010 20$^{th}$ Proceedings International Conference on*, Aug. 2010, pp. 201-204.

Zhou et al., "Transforming Traditional Iris Recognition Systems to Work on Non-Ideal Situations," In *Industrial Electronics, IEEE Transaction on* 56(8), 2009, pp. 3203-3213.

Zuo et al., "A Robust Iris Segmentation Procedure for Unconstrained Subject Presentation," In *Biometric Consortium Conference, 2006 Biometrics Symposium*: Special Session on Research at the, 2006, pp. 1-6.

Zuo et al., "On a Methodology for Robust Segmentation of Nonideal Iris Images," *Systems, Man and Cybernetics, Part B: Cybernetics, IEEE Transactions on*, 40(3), Jun. 2010, pp. 703-718.

\* cited by examiner

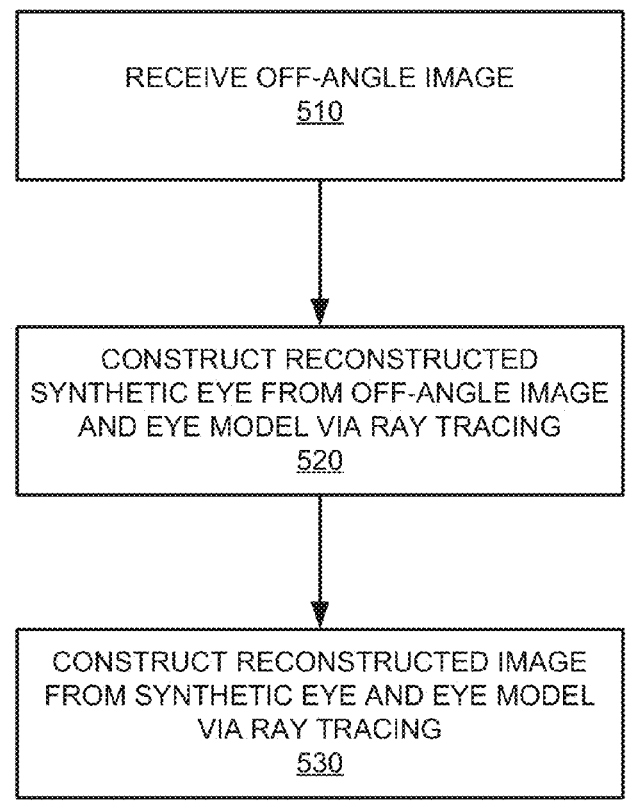
FIG. 5

Procedure 1 *TraceRay()*: Trace ray from camera to iris.

Input: $p_0, dir, trace$
1: if $dir \neq 0$ then
2:    $trace \leftarrow trace \cup p_0$
3:    $\{inter, norm, obj\} \leftarrow$ ClosestIntersection$(p_0, dir)$
4:    if $(norm \neq 0) \& (obj \neq IRIS)$ then
5:      $dir \leftarrow$ ComputeRefraction$(p_0, dir, inter, norm)$
6:      TraceRay$(inter, dir, trace)$
7:    else
8:      if $obj = IRIS$ then
9:         $trace \leftarrow trace \cup inter$
10:         return $trace$
11:      end if
12:    end if
13: end if
14: return $\emptyset$

FRONTAL VIEW RECONSTRUCTION FOR IRIS RECOGNITION

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

The field relates to technologies for improved iris recognition.

BACKGROUND

Iris recognition is an effective way to identify a person conclusively. For example, a camera can take an image of a person's iris and match it against a gallery of irises associated with known individuals. Such identification techniques can be helpful in a wide variety of security and other applications.

Iris recognition works well in ideal conditions; however, problems arise if the images are less than ideal. For example, if an image is taken from an off-angle perspective, conventional recognizers have difficulty. In practice, such images can be common, so iris recognition technology is hampered by such limitations.

Thus, although current iris recognition technologies can provide useful functionality, there is room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

As described herein, a wide variety of technologies can be applied to reconstruct a frontal view of an iris. The effect of the limbus can be modeled during the reconstruction process. An aspherical eye model can be used. Ray tracing can be employed. Corneal refraction can be modeled. Precomputed transforms can increase performance so the technologies are suitable for use in commercial applications.

The technologies described herein can be used in conjunction with conventional iris recognition technologies and images. Thus, current images and recognition techniques can be used without having to retool underlying software systems.

As described herein, a variety of other features and advantages can be incorporated into the technologies as desired.

BRIEF DESCRIPTION OF THE DRAWINGS

FIG. 5 is a flowchart of an exemplary method of implementing frontal view reconstruction via an eye model.

FIG. 24 is a pseudo code listing of a ray-tracing technique.

DETAILED DESCRIPTION

Example 1

Exemplary Overview

The technologies described herein can be used for improved iris recognition, particularly in scenarios involving images having an off-angle gaze. Adoption of the technologies can provide greatly improved recognition, even under less than ideal conditions.

The technologies can be helpful for those wishing to improve existing systems by leveraging existing iris image galleries. For example, the technologies can serve as a pre-processor for conventional iris recognition software.

Beneficiaries include iris recognition software developers who wish to improve recognition performance under real world conditions. End users also benefit from the technologies because they can enjoy better recognition performance.

Example 2

Exemplary System Implementing Frontal View Reconstruction

Figure 1:
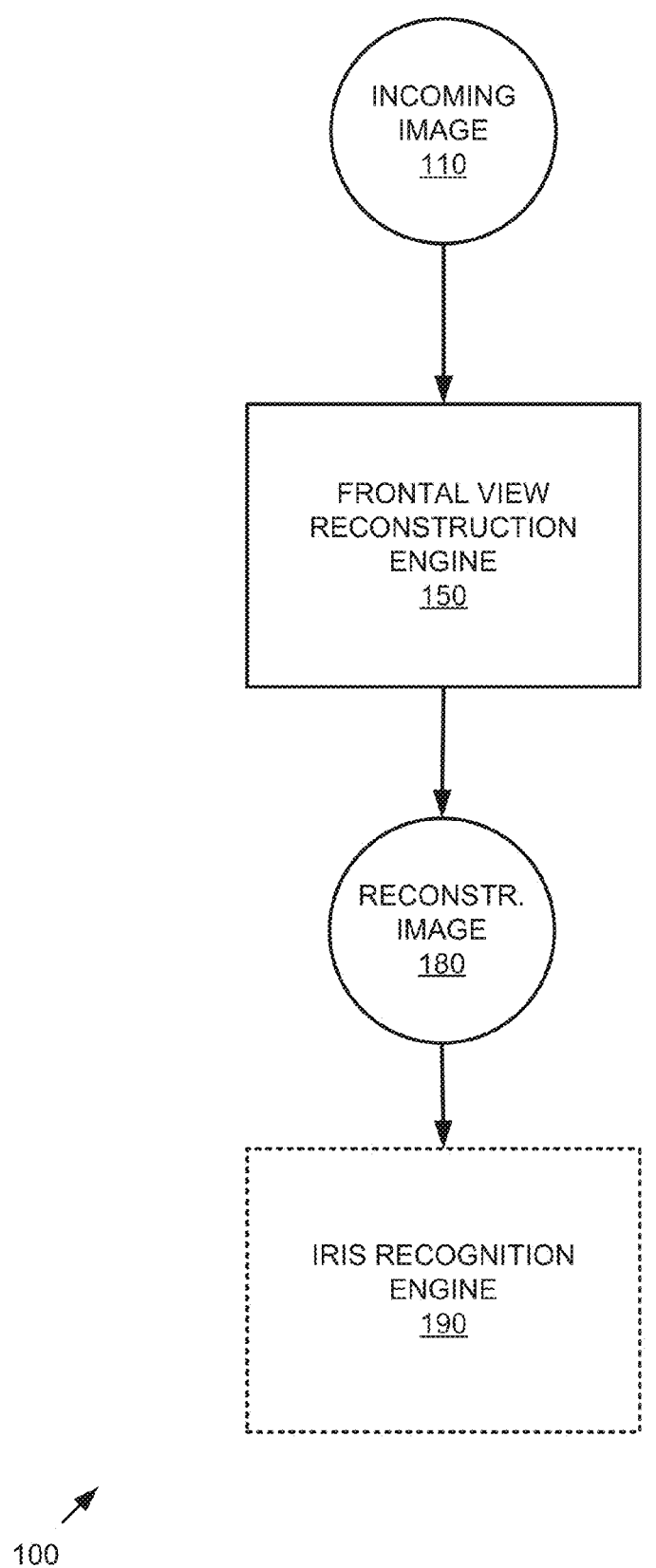
FIG. 1 is a block diagram of an exemplary system implementing frontal view reconstruction for iris recognition.

FIG. 1 is a block diagram of an exemplary system 100 implementing frontal view reconstruction for iris recognition as described herein.

For purposes of context, an iris recognition engine 190 is shown. In the example, a frontal view reconstruction engine 150 accepts an incoming image 110 and generates a reconstructed image 180.

As described herein, the incoming image 110 can depict an iris with an off-angle gaze. Other parts of the eye are typically included. The reconstructed image 180 can depict the same iris from a frontal view (e.g., a reconstructed frontal view as described herein).

Of course, because the image 110 comprises an off-angle gaze, the reconstructed frontal view of the image 180 is estimated. Therefore, it is sometimes called "converted," "re-projected," "emulated," or "transformed." As described herein, a variety of techniques can be used to generate the reconstructed image 180. Eye models, ray tracing, transforms, measured displacements via optical flow, genetic algorithms, and the like can be applied.

The system 100 can be described as a single, unified system, or one or more client systems and one or more server systems. For example, the reconstruction engine 150 and iris recognition engine 190 can be considered a single system or be provided separately by different vendors or parties (e.g., the reconstruction engine 150 can be a plug-in or preprocessor for the engine 190).

In practice, the systems shown herein, such as system 100 can vary in complexity, with different functionality, components of differing complexity, and the like. For example, additional preprocessing or post-processing can be performed on the images 110, 180. Additional functionality related to iris recognition (e.g., security, biometrics, or the like) can also be incorporated.

The system 100 and any of the other systems described herein can be implemented in conjunction with any of the hardware components described herein, such as the computing systems described below (e.g., processing units, memory, and the like). In any of the examples herein, the inputs, outputs, and engines can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a local application without concern over the actual computing infrastructure needed or used to operate the servers, which can be administered by a business entity different from the client user organization.

Example 3

Exemplary Method Implementing Frontal View Reconstruction

Figure 2:
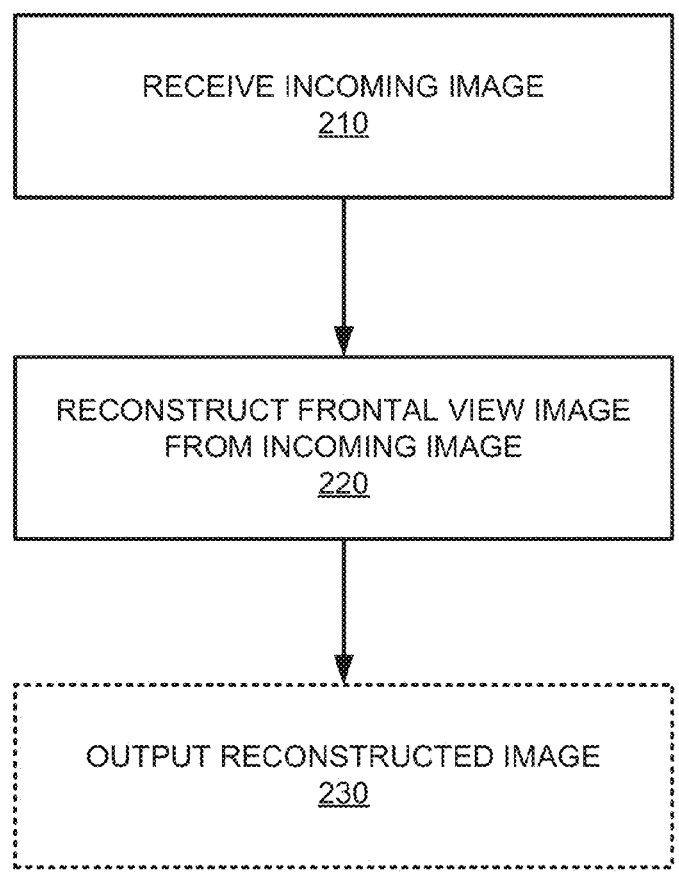
FIG. 2 is a flowchart of an exemplary method of implementing frontal view reconstruction for iris recognition.

FIG. 2 is a flowchart of an exemplary method 200 of implementing frontal view reconstruction for iris recognition and can be implemented, for example, in the system shown in FIG. 1.

At 210, an incoming off-angle iris image depicting an iris with an off-angle gaze is received. For example, a camera can be used to capture an image of a subject's eye.

At 220, from the off-angle iris image, a frontal view image of the iris is reconstructed. As described herein, a variety of techniques can be used to generate the frontal view image. As described herein, the reconstructing can account for limbus effect. As described herein, the gaze angle can be at or more than 30, 40, 50, 60, or 70 degrees away from frontal. As described herein, corneal refraction can be modeled in the frontal view of the iris.

In practice, the reconstructed image is then used for iris recognition purposes. At 230, the reconstructed image is output. The image can then be used for iris recognition purposes (e.g., submitted to iris recognition software) as described herein. In some cases, masking can be applied during iris comparison. In some cases, the output image can be used for constructing precomputed transforms, machine learning, or the like.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Off-Angle Gaze

In any of the examples herein, an off-angle gaze can denote an eye or iris with a gaze angle other than that from a frontal perspective. For purposes of convenience, a completely frontal view (e.g., a gaze in line with the optical axis) can be denoted as 0 degrees or "on-axis." Off-angle gazes involve perspectives taken from off angles, where the angles are deviated from 0 degrees in a horizontal plane, a vertical plane, or both. For purposes of convenience, such angles are designated as $\theta_v$ for vertical gaze angles and $\theta_h$ for horizontal gaze angles (e.g., azimuth). In practice, a particular off-angle gaze may have one or both of vertical and horizontal components, and the technologies described herein can be applied to such scenarios. Some examples herein refer to a gaze angle without specifying horizontal or vertical; such angles are typically assumed to be $\theta_h$.

Figure 3A:
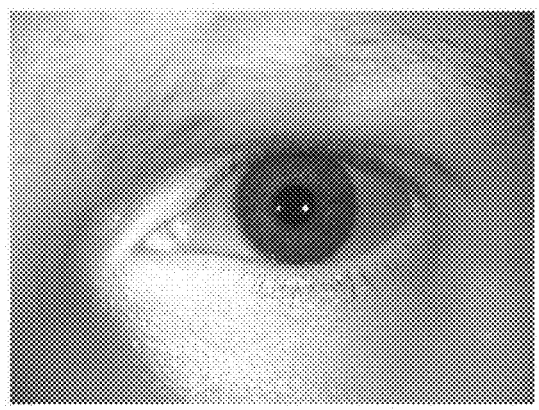
FIGS. 3A-B are eye images showing eyes at different gaze angles.
Figure 3B:
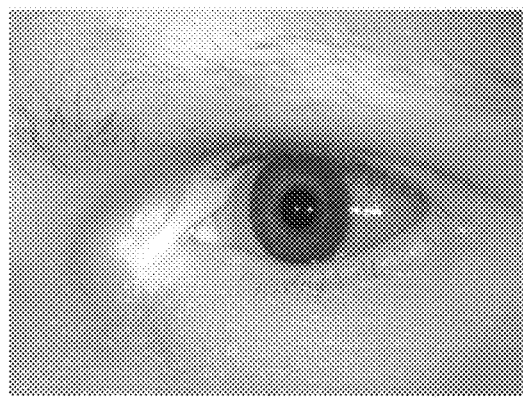

FIGS. 3A-B are eye images showing eyes at different gaze angles. The image of 3A comprises an on-axis (0 degrees) iris image, and the image of 3B comprises a 40 degree off-axis iris image. For an on-axis image, the eye and camera share the same optical axis, while for off-axis images, the axes have different directions. As described herein, the technologies can reconstruct (e.g., estimate) the image of 3A based on an input image resembling that of 3B.

Although the term "gaze" is used, the direction in which the eye is gazing (e.g., with respect to the gazer) can be independent of the gaze angle. For example, an iris image of a frontally gazing eye can be captured at a 30 degree angle, resulting in a 30 degree gaze angle. Thus, the term "gaze" can be used to denote the angle at which the eye is gazing with respect to the capture perspective.

The term "off-angle" can be used to denote an image or other representation of an eye or iris that exhibits an off-angle gaze.

Example 5

Exemplary Eye Model

In any of the examples herein, an eye model can be used to model the anatomy of an eye when performing analysis on images or generating precomputed transformations. As described herein, the model can be anatomically based. An aspherical eye model can be used. The aspherical shape can be symmetrical (e.g., near-sphere, ellipse) or asymmetrical (e.g., melon shape). The aspheric shape can be corrected to account for defects such as astigmatism. Structures within the eye, such as the limbus, cornea, aqueous humor, and the iris itself can be modeled via the model.

In practice, the eye model is a collection of digital parameters that can model three-dimensional or two-dimensional structures, account for an index of refraction, the position of structures within the eye, the gaze angle, and the like.

Example 6

Exemplary Reconstructed Synthetic Eye

In any of the examples herein, a synthetic eye can be constructed for use in reconstructing a frontal view. In practice, an off-angle image can be used to construct the synthetic eye (e.g., the iris). A digital representation (e.g., map) of the iris can thus be stored.

Subsequently, a simulated frontal view of the synthetic iris (e.g., with a synthetic camera) can be used to reconstruct a frontal view of the iris portrayed in the off-angle image. Corneal refraction and other effects can be modeled because actual (e.g., non-reconstructed) frontal images involve such effects.

Example 7

Exemplary Preprocessing Before Recognition

In any of the examples herein, the resulting image can be used in a preprocessing scenario. For example, the reconstructing or other processing can be performed as image preprocessing before submission to iris recognition logic or software. The iris recognition software can be provided by a third party. The preprocessing can be performed by a plug-in or other extension to the iris recognition software or be fully integrated therein.

Submission of the resulting image to iris recognition software can result in superior iris recognition performance, even at large gaze angles.

Example 8

Exemplary System Implementing Reconstruction View Eye Model

Figure 4:
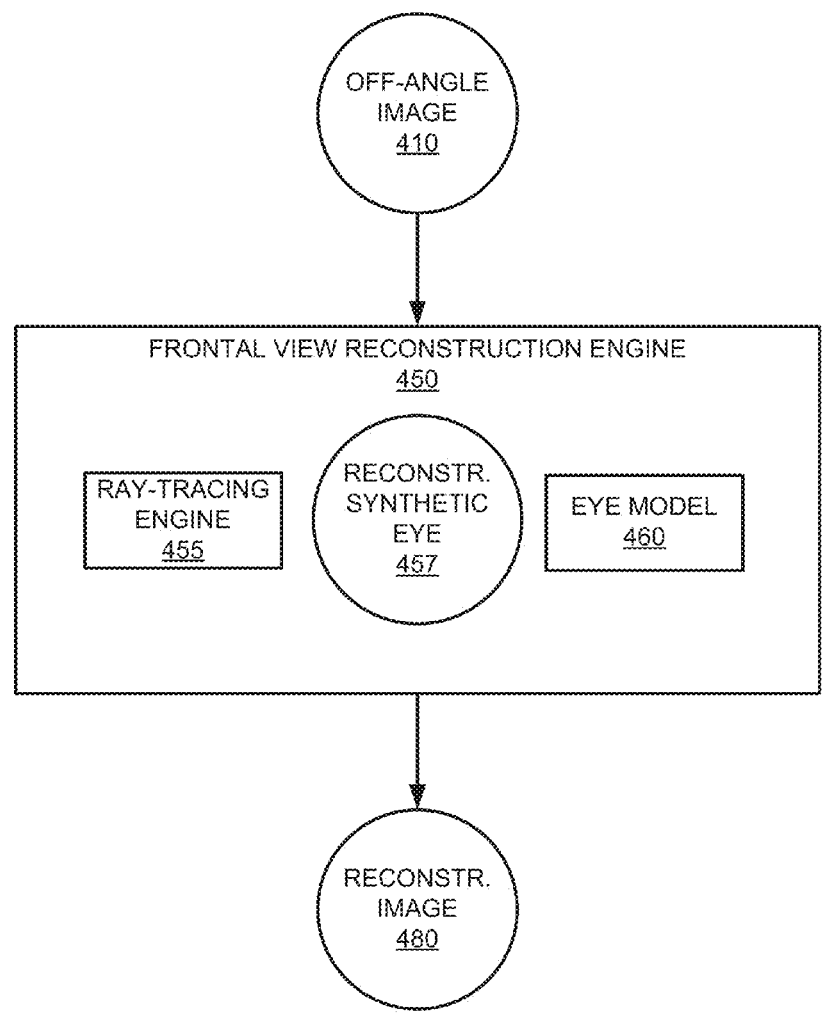
FIG. 4 is a block diagram of an exemplary system implementing frontal view reconstruction via an eye model.

FIG. 4 is a block diagram of an exemplary system 400 implementing frontal view reconstruction via an eye model. In the example, the frontal view reconstruction engine 450 accepts an off-angle image 410 as input and outputs the reconstructed image 480.

The frontal view reconstruction engine 450 can comprise a ray-tracing engine 455 and an eye model 460 that can be used to generate a synthetic eye 457. A frontal view of the synthetic eye can then be generated for use as the reconstructed image 480. Additional image processing and filtering can be performed.

Example 9

Exemplary Method Implementing Reconstruction Via Eye Model

FIG. 5 is a flowchart of an exemplary method 500 of implementing frontal view reconstruction via an eye model and can be implemented, for example, via the system shown in FIG. 4.

At 510, an off-angle image (e.g., depicting an iris) is received.

At 520, a reconstructed synthetic eye is constructed from an off-angle image and eye model via ray tracing. Ray-tracing techniques can be used to generate a synthetic eye (e.g., the iris) on which additional processing can be performed. Essentially, ray tracing writes the synthetic iris appearance to a representation of a synthetic iris in appropriate locations mimicking a physical manifestation of the iris. Alternatively, a mapping between points can be determined without having actual iris data.

At 530, a reconstructed image is constructed from the reconstructed synthetic eye and eye model via ray tracing. Again, ray tracing can be used, but a frontal view can be generated. Essentially, the synthetic eye is viewed from the front (e.g., by a synthetic camera).

Example 10

Exemplary Reconstruction Via Precomputed Transforms

Figure 6:
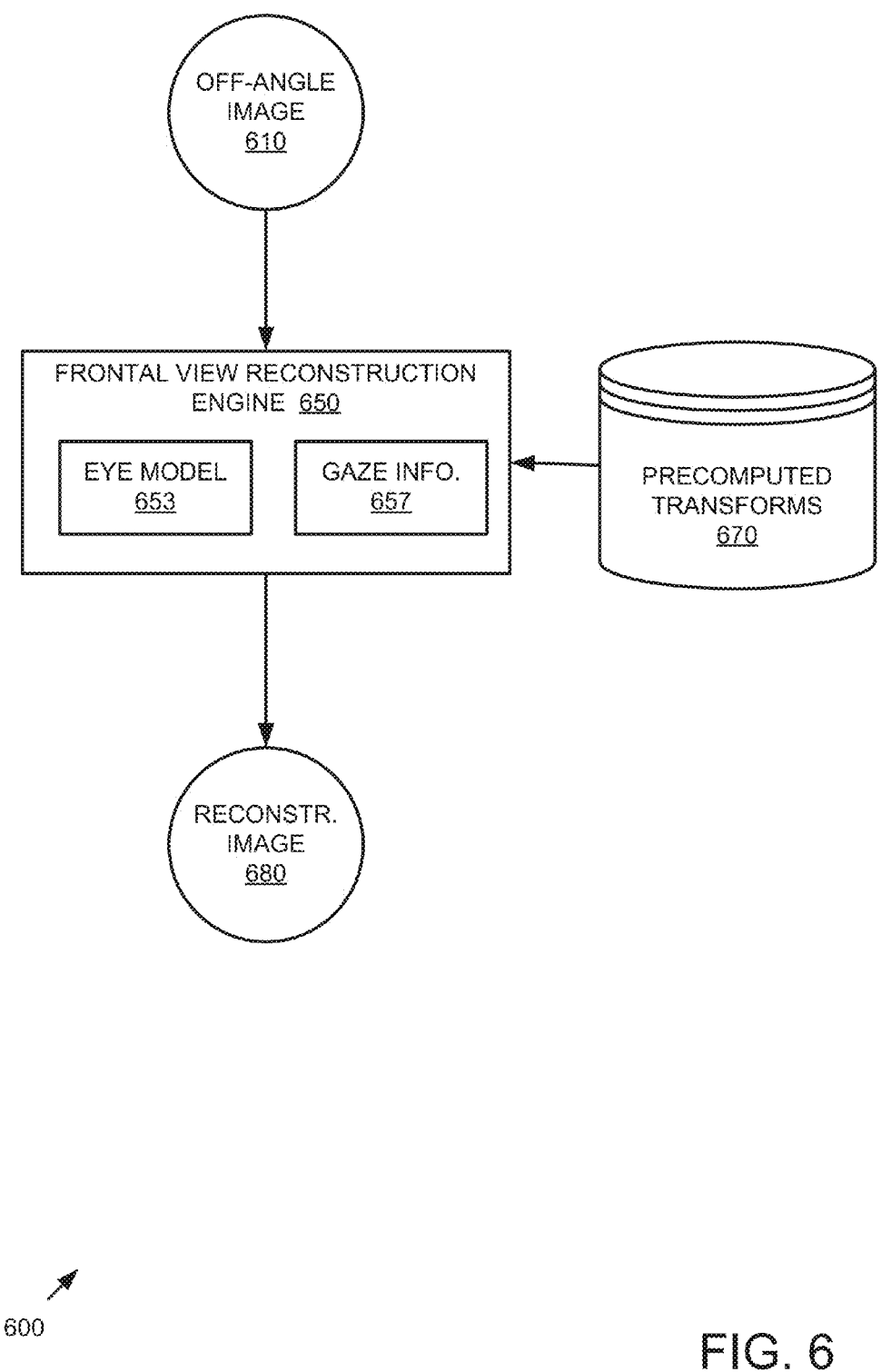
FIG. 6 is a block diagram of an exemplary system implementing frontal view reconstruction via precomputed transforms.

FIG. 6 is a block diagram of an exemplary system 600 implementing frontal view reconstruction via precomputed transforms 670. In any of the examples herein, reconstruction can comprise applying a transform to an off-angle iris image.

As in the other examples, an off-angle image 610 can be received by the frontal view reconstruction engine 650. A reconstructed image 680 can be output for use in iris recognition. The engine 650 can take advantage of the transforms 670, which can be generated by the various technologies described herein (e.g., ray tracing, etc.).

The engine 650 can make use of gaze information 657 that indicates a gaze angle combination for the off-angle image

610. Such information can be determined via a gaze analyzer as described herein (e.g., analyzing eccentricity of structures in the off-angle image 610). The gaze information 657 can be used when choosing a given transform.

Thus, the eye models and other techniques described herein can be used to generate the transforms 670 in advance of use in recognition. At runtime, precomputed transforms can provide improved performance.

Example 11

Exemplary Method Implementing Reconstruction Via Precomputed Transforms

Figure 7:
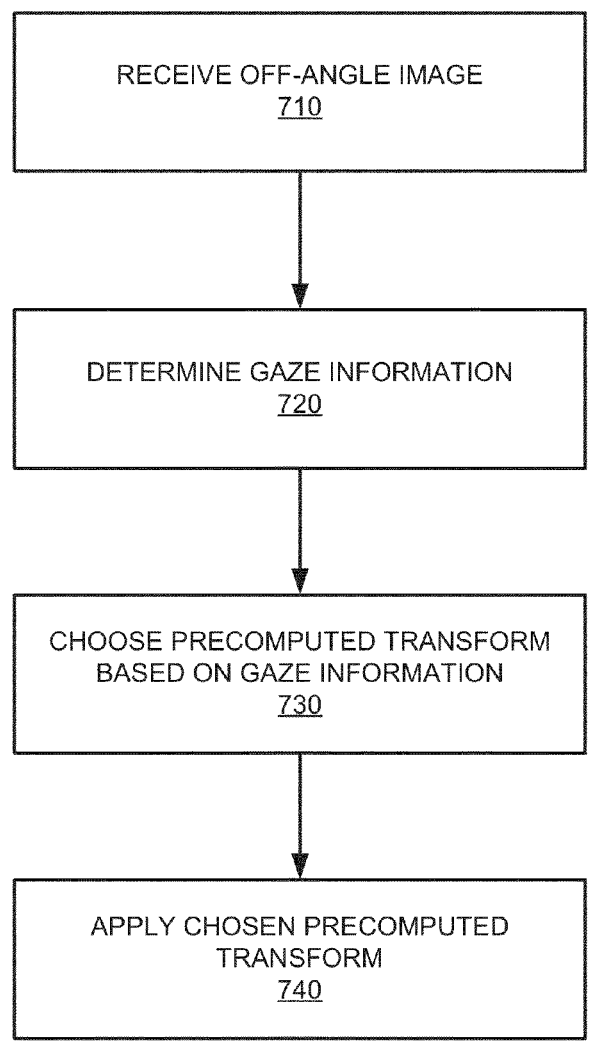
FIG. 7 is a flowchart of an exemplary method of implementing frontal view reconstruction via precomputed transforms.

FIG. 7 is a flowchart of an exemplary method 700 of implementing frontal view reconstructions via precomputed transforms and can be implemented, for example, via the system shown in FIG. 6.

At 710, an off-angle image (e.g., depicting an off-angle iris) is received.

At 720, gaze information is determined. For example, the gaze angle and distance from camera can be determined. In practice, some information (e.g., distance from camera) may already be available.

At 730, a precomputed transform is chosen based on the gaze information. For example, a given precomputed transform may be applicable to a certain range combination of horizontal gaze angle range and vertical gaze angle range. Thus, given a particular horizontal gaze angle and vertical gaze angle, the proper precomputed transform out of a set of transforms can be chosen.

At 740, the chosen precomputed transform is applied to the off-angle image to generate the output image, which can then be output (e.g., for iris recognition purposes).

Example 12

Exemplary Precomputed Transform

In any of the examples herein, a transformation (or "transform") can map pixels from an off-angle iris image to an image of a frontal view of the iris. As described herein, such transformations can be computed in advance of receiving the off-angle image (e.g., for recognition). Because the transformation will apply to a certain range of off-angle gaze angles, a plurality of transforms are typically calculated in advance (e.g., for different ranges of view angles). At recognition time, a precomputed transform can be chosen based on a gaze angle (e.g., horizontal, vertical, or both in combination). Transformations calculated in advance can be called "precomputed" transforms. They can be partially or fully precomputed for use at recognition time. Thus, the technologies can use per-gaze-angle-degree-range precomputed transforms (e.g., different transforms for different ranges of gaze angle type, whether horizontal, vertical, or both).

Any of the techniques described herein can be integrated into the transform, and the ultimate transform can comprise a combination of sub-transforms. For example, a transform can be computed from modeling anatomy of an eye (e.g., based on an aspherical eye model). Corneal refraction can be modeled. Ray tracing can be used. A transform can be computed from measured optical flow between pairs of off-angle and frontal iris images. A transform can be computed via a genetic algorithm (e.g., producing a look-up table) or other machine learning techniques.

In practice, the precomputed transform can take the form of a look-up table (e.g., mapping pixels from the off-angle image to a frontal image), an array of vectors (e.g., indicating displacement of pixels), or the like. Intermediate transforms as described herein (e.g., mapping from off-angle iris image to unrefracted iris; mapping from unrefracted iris and reconstructed frontal image; etc.) can be combined.

When applying the transform, the off-angle iris image can be scaled to match the size of the eye model used to compute the transform. Other adjustments (e.g., rotating the off-angle iris image to align an axis of the iris with an iris of an eye model used to compute the transform) can be implemented.

Example 13

Exemplary Gaze Information

In any of the examples herein, gaze information can be used for a variety of purposes. Such information can include the distance to the eye (e.g., from the camera, whether actual or synthetic), gaze angle combination (e.g., horizontal, vertical, or both) with respect to the optical axis, and the like. Other information, such as focal length, sensor characteristics, and the like can be included in the analysis. In some cases, the information can be determined from an image, or the information may be known, included as metadata, or the like.

To determine gaze angle, eccentricity of the iris or pupil can be used.

Example 14

Exemplary System Constructing Reconstructed Synthetic Eye

Figure 8:
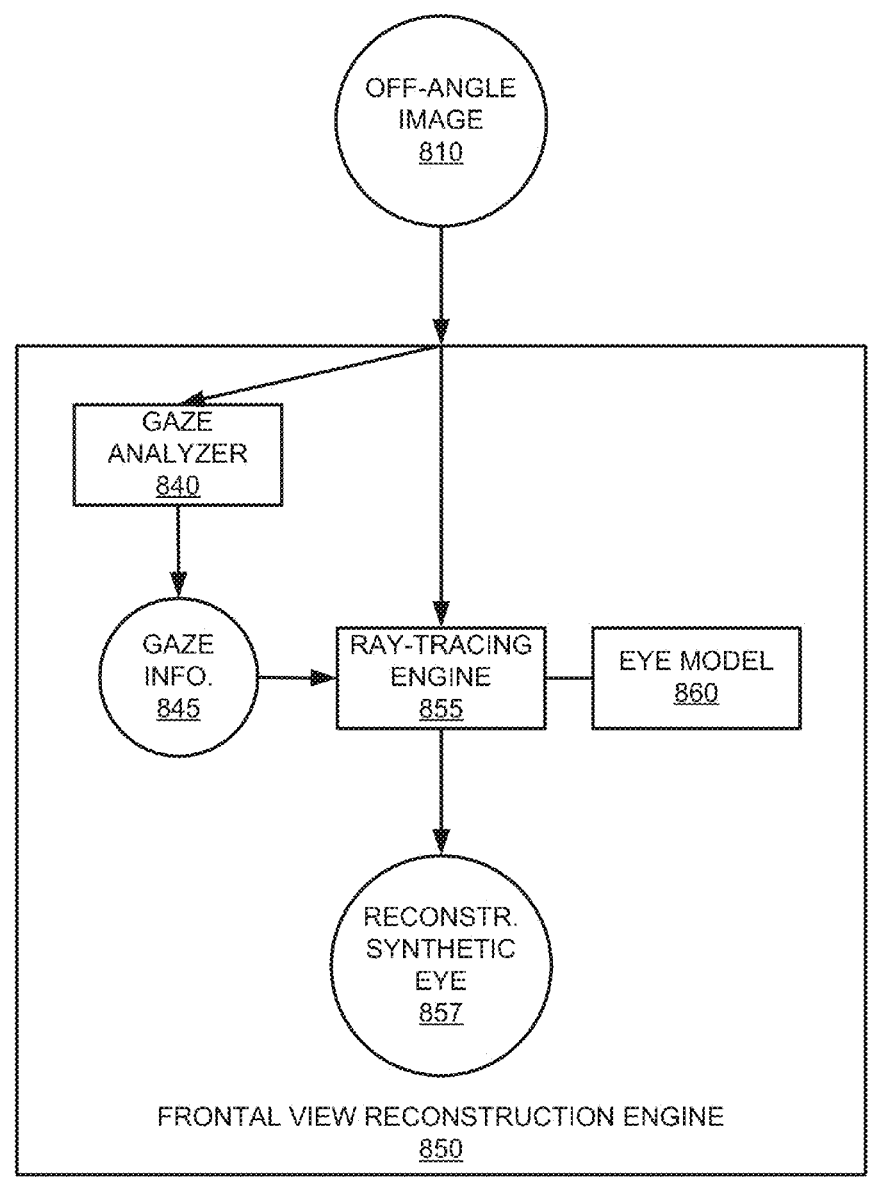
FIG. 8 is a block diagram of an exemplary system constructing a reconstructed synthetic eye from an off-angle image.

FIG. 8 is a block diagram of an exemplary system 800 constructing a reconstructed synthetic eye from an off-angle image. The system 800 operates to generate a synthetic eye 857 that can be used in conjunction with other systems to provide a complete solution to frontal view reconstruction.

In the example, the frontal view reconstruction engine 850 receives an off-angle image 810 and generates a synthetic eye 857 (e.g., iris) via the ray-tracing engine 855. As described herein, the synthetic eye 857 can then be used (e.g., by system 1000 of FIG. 10) to generate a reconstructed frontal view of the iris depicted in the off-angle image 810. In practice, the systems can be combined into a single engine.

The ray-tracing engine 855 can perform ray tracing as described herein with reference to an eye model 860 and gaze information 845 as determined by the gaze analyzer 840 to generate the synthetic eye 857. Other information can be obtained from other sources.

Example 15

Exemplary Method of Constructing Synthetic Eye

Figure 9:
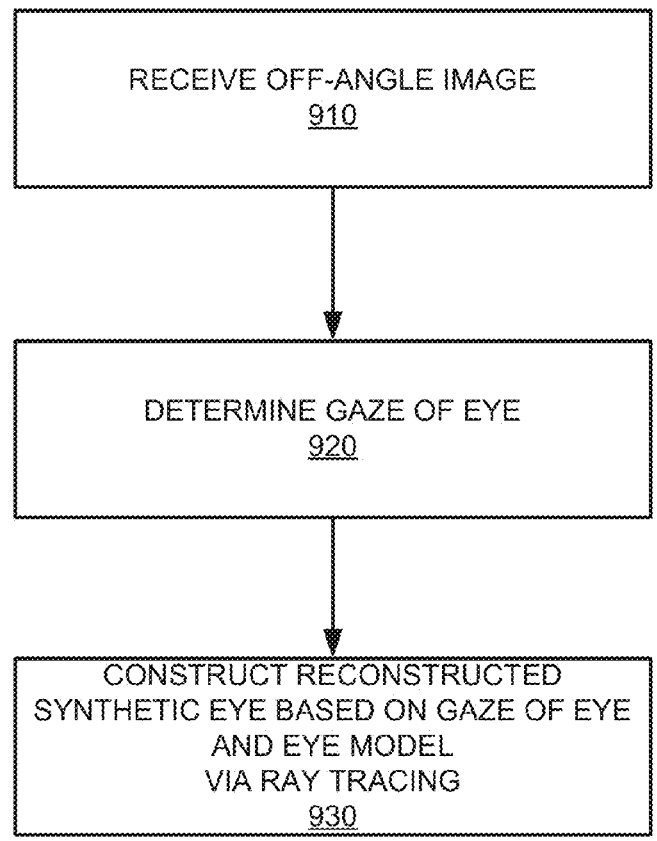
FIG. 9 is a flowchart of an exemplary method of constructing a reconstructed synthetic eye from an off-angle image.

FIG. 9 is a flowchart of an exemplary method 900 of constructing a synthetic eye from an off-angle image and can be implemented, for example, in the system shown in FIG. 8.

At 910, an off-angle image depicting an iris is received.

At 920 the gaze of the eye is determined.

At 930, a reconstructed synthetic eye (e.g., iris) is constructed based on the gaze of the eye and an eye model via ray tracing as described herein.

Example 16

Exemplary System Reconstructing Image from Synthetic Eye

Figure 10:
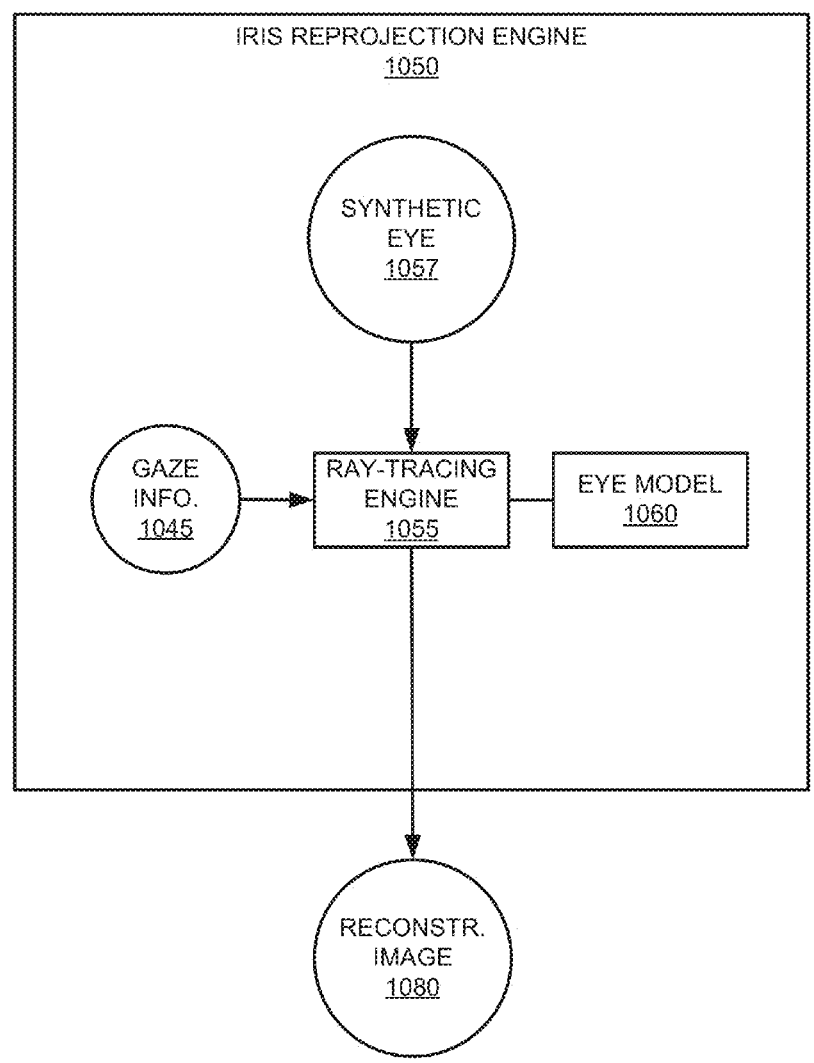
FIG. 10 is a block diagram of an exemplary system reconstructing an image from a synthetic eye.

FIG. 10 is a block diagram of an exemplary system 1000 reconstructing an image from a synthetic eye. In the example, the synthetic eye 1057 (e.g., iris) is received as input by a ray-tracing engine 1055, which is able to output a reconstructed image 1080 from the synthetic eye 1057 and model corneal refraction as described herein.

The eye model 1060 can include information about the cornea, the shape of the eye (e.g., aspherical), and the like. The gaze information 1045 may be simplified because the gaze angle is desired to be 0 for both horizontal and vertical angles. Other information, such as camera location, focal length, sensor size, and the like can be incorporated.

Due to the limbus effect, some information that is available in the synthetic iris may be occluded by the limbus in a frontal view. If so, it is not depicted in the reconstructed image 1080.

Also as described herein, some information may not have been available (e.g., portions of the iris are unviewable) in the off-angle image due to limbus occlusion, so the reconstructed frontal image 1080 may be missing such information. The information can be designated as to be masked when performing recognition.

Example 17

Exemplary Method of Reconstructing Image from Synthetic Eye

Figure 11:
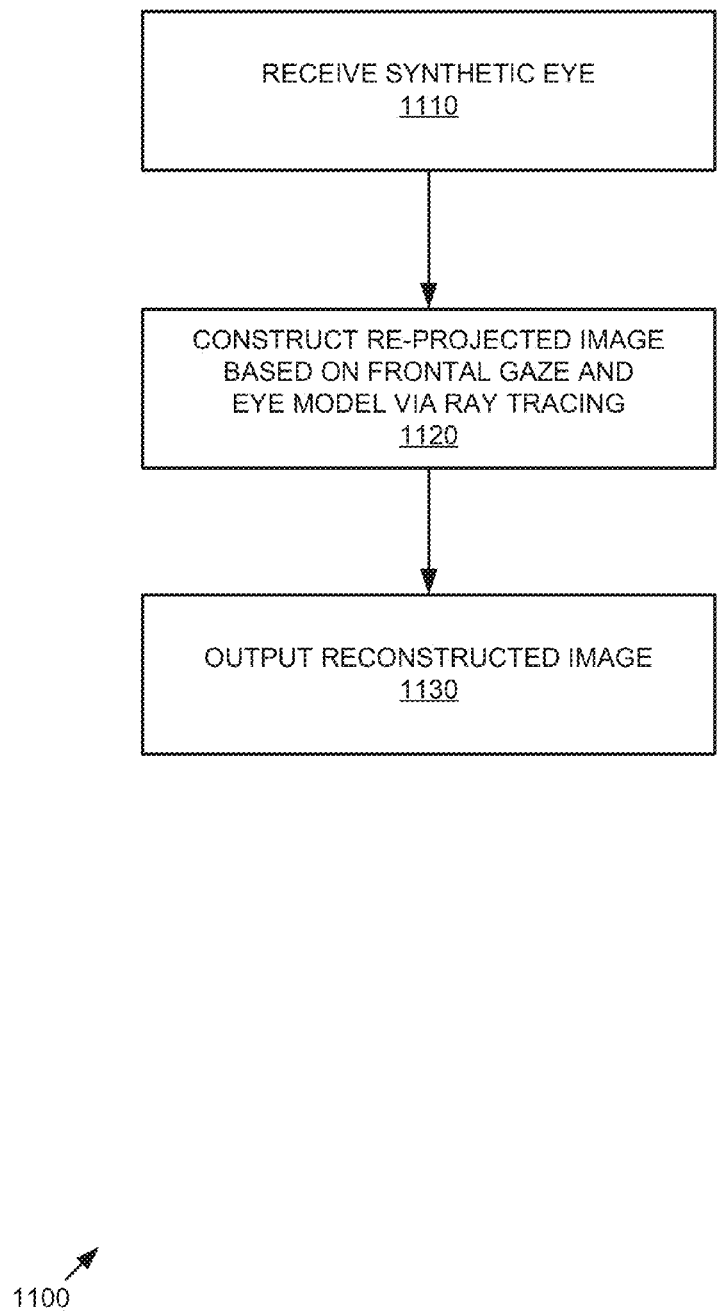
FIG. 11 is a flowchart of an exemplary method of reconstructing a frontal image from a synthetic eye.

FIG. 11 is a flowchart of an exemplary method 1100 of reconstructing a frontal image from a synthetic eye and can be implemented, for example, in the system shown in FIG. 10.

At 1110, a synthetic eye (e.g., iris) is received. The synthetic eye can represent the texture of the iris in two-dimensional or three-dimensional space.

At 1120, a re-projected image of the iris is constructed based on a frontal gaze and the eye model via ray tracing as described herein.

At 1130, the reconstructed image is output. The image can then be used for image recognition purposes or to construct a precomputed transform as described herein.

Example 18

Exemplary Eye Model

Figure 12:
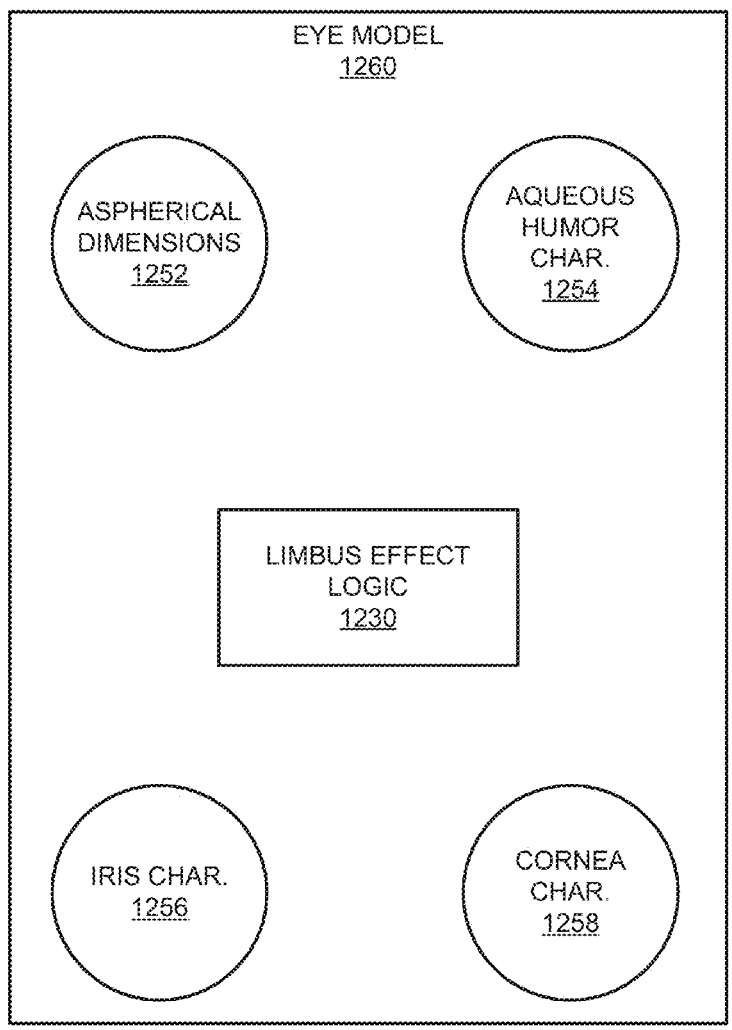
FIG. 12 is a block diagram of an exemplary eye model.

FIG. 12 is a block diagram of an exemplary eye model 1260. The model 1260 models the biology and anatomy of the eye. The elements of the model can be grouped conceptually even if stored separately.

The model 1260 can include parameters. In the example, the model 1260 includes the aspherical dimensions 1252 as described herein, aqueous humor characteristics 1254, iris characteristics 1256, and cornea characteristics 1258.

The limbus effect logic 1230 can simulate the effects of occlusion by the limbus and can include physical characteristics of the limbus.

Although a generalized eye model can be used with success, a personalized eye model can be used to model individuals, subpopulations, or the like.

In precomputed transform scenarios, some aspects of the eye model may be unnecessary because they are implicit in the transform. However, other, additional aspects may be needed to help match (e.g., scale, rotate, or the like) the off-angle iris with the eye model used to compute the transform.

Example 19

Exemplary Ray Tracing

Figure 13:
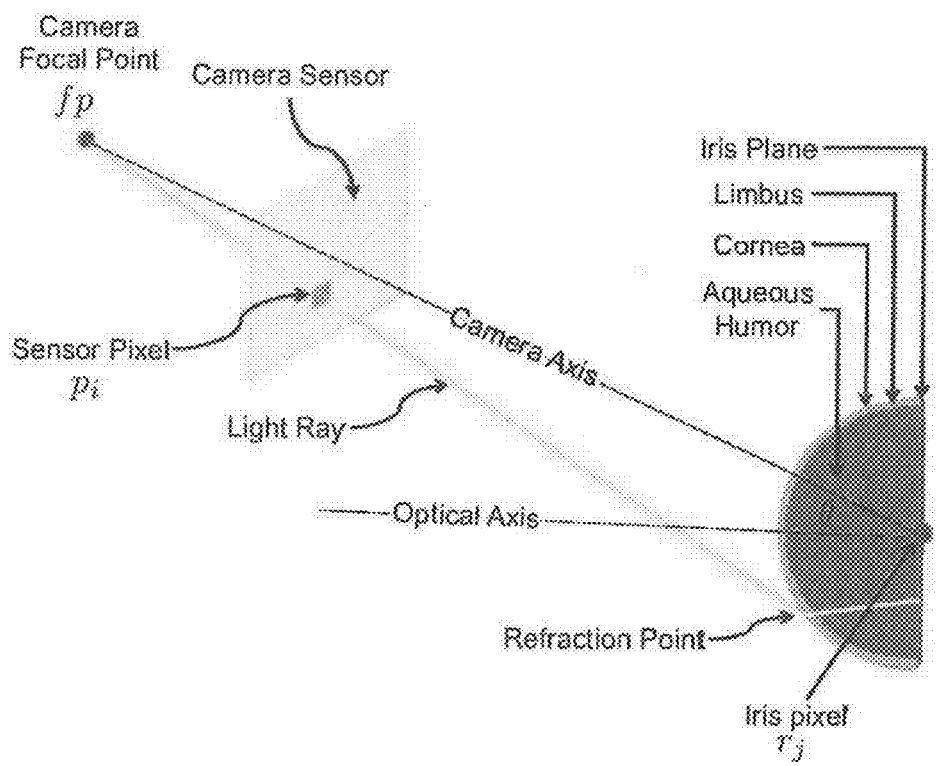
FIG. 13 is a block diagram showing ray tracing for reconstructing a frontal view.

FIG. 13 is a block diagram showing a ray trace model for reconstructing a frontal view. As described herein, the model can be used to construct a synthetic eye and then reconstruct a frontal view via the synthetic eye.

Example 20

Exemplary Limbus Effects

Figure 14:
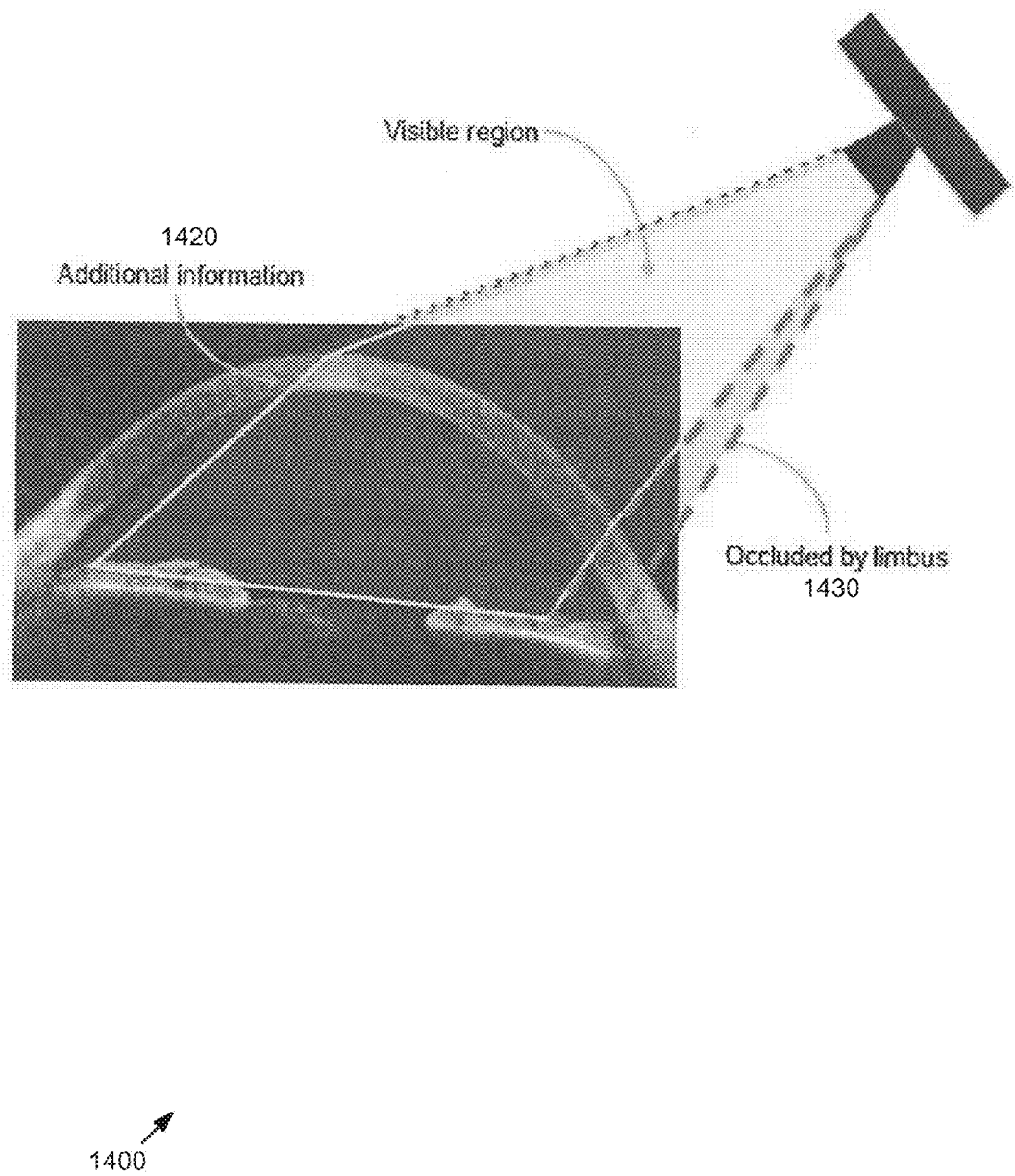
FIG. 14 is a block diagram showing effects of the limbus.

FIG. 14 is a block diagram showing effects of the limbus. The iris visible region changes with gaze. Because of the off-angle gaze, some portions of the limbus (e.g., corresponding to additional image information 1420) are visible in the off-angle gaze that would not be visible in a frontal view. As described herein, such information is discarded (e.g., not included) when reconstructing the frontal view.

Similarly, because of the off-angle gaze, some portions of the limbus 1430 that would be visible in a frontal view are occluded. Such information can be masked from consideration (e.g., in the probe and the gallery image) to prevent it from disrupting the recognition process.

Example 21

Exemplary Limbus Effects on Reconstructed Frontal Image

Figure 15:
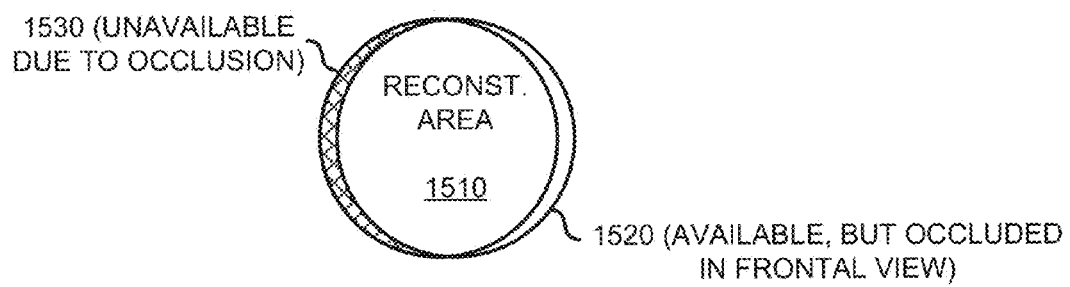
FIG. 15 is a block diagram showing effect of the limbus on a reconstructed frontal image.

FIG. 15 is a block diagram showing effect of the limbus on a reconstructed frontal image of an iris. The image is not to scale. A physical location of the limbus (e.g., within the eye) can be modeled during the reconstruction process to determine the effect of the limbus on the reconstructed frontal image.

As a result, in any of the examples herein, reconstructing the frontal view 1510 can comprise removing a portion 1520 of the off-angle iris image occluded by the limbus due to the frontal view being viewed frontally.

As another result, in any of the examples herein, when reconstructing a frontal view, a portion of the frontal view of the iris can be masked from consideration during iris recognition (e.g., due to limbus occlusion). The limbus occlusion causes certain portions of the iris 1530 to be unavailable for reconstruction. Accordingly, the portions of the iris that were occluded by the limbus in the off-angle iris image (e.g., as indicated by the eye model) can be so masked. Because such information is not available for reconstruction, masking it from consideration during iris recognition can result in better recognition performance. Masking can prevent the portion of the gallery image that corresponds to the missing portion of the probe image from being considered, which would otherwise result in mismatch of the image portion that is being masked.

Also, when segmentation is performed on the iris, such segmentation can be based on modeled occlusion by the limbus, resulting in more accurate segmentation. Thus, iris and non-iris image data can be properly separated. Subsequently, when the image of the iris is unwrapped, the improved segmentation can result in superior unwrapped image results, which are ultimately submitted for recognition by iris recognition logic.

Example 22

Exemplary Masking of Image

As described herein, when a frontal view is reconstructed, some information (e.g., portions of the iris) may be not be available because some portions of the iris may not have been viewable due to the gaze angle and occlusion by the limbus. In such a case, the areas of the image can be masked from consideration during the recognition process.

A recognizer may accept parameters (e.g., via an API or other mechanism) to indicate which portions of the image are not to be considered during recognition. Consequently, the masked portions can be disregarded during recognition (e.g., comparison with gallery images).

Example 23

Exemplary Optical Flow System

Figure 16:
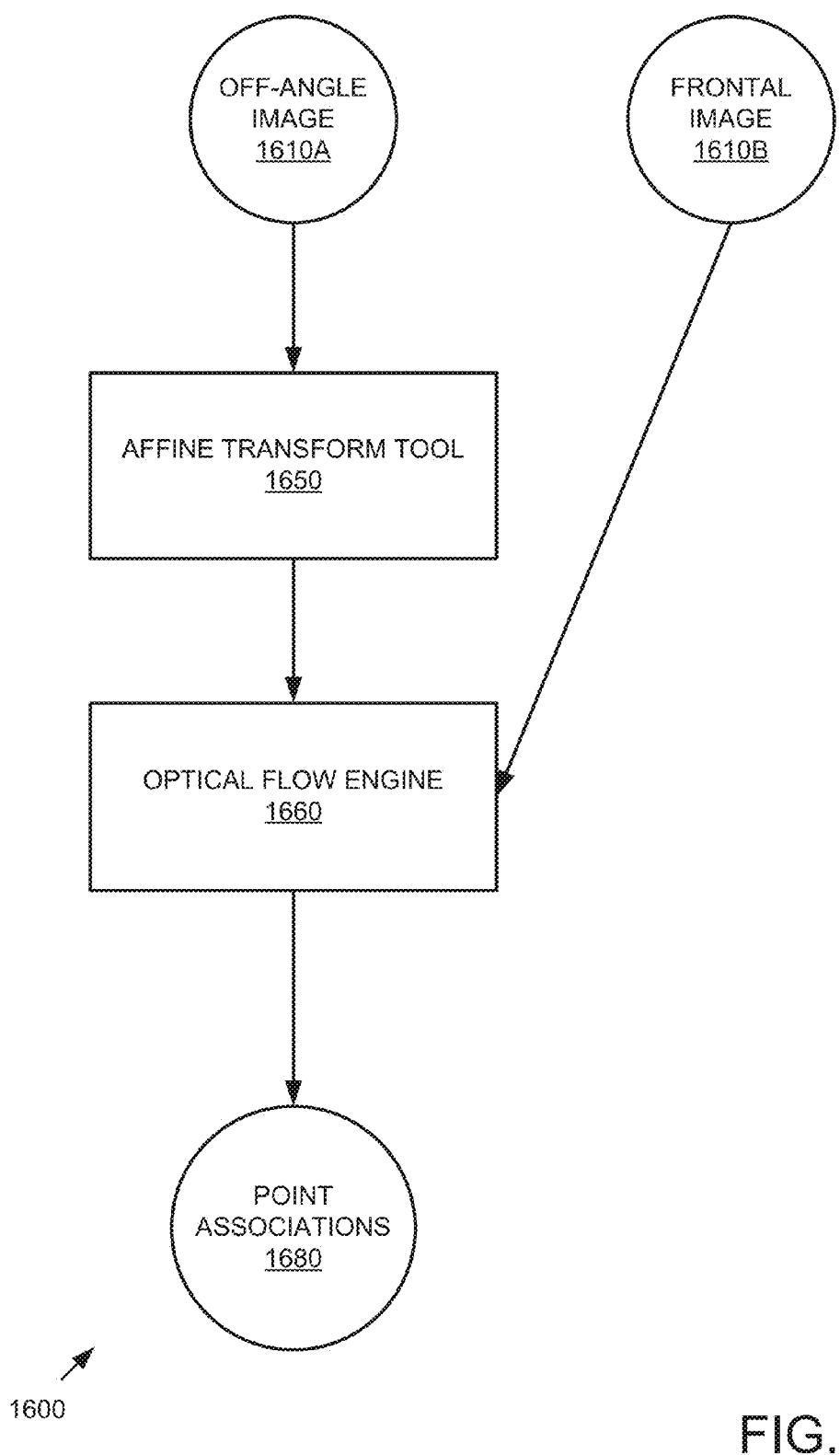
FIG. 16 is a block diagram of an exemplary system using measured optical flow to determine point associations between an off-angle image and a frontal image.

FIG. 16 is a block diagram of an exemplary system 1600 using measured optical flow to determine point associations between an off-angle image 1610A (e.g., having a gaze angle combination) and a frontal image 1610B (e.g., an actual frontal image of the same iris shown in the off-angle image 1610A). In the example, an affine transform tool 1650 accepts an off-angle image 1610A as input and applies an affine transform as described herein. Additional processing can be performed as described herein.

An optical flow engine 1660 can measure texture displacement from the off-angle image (e.g., with respect to the frontal image 1610B) using optical flow techniques. Point associations 1680 can then be produced that indicate which points in the off-angle image correspond to those in the frontal image 1610B. Such associations 1680 can be used as a transformation applied to new off-angle images to generate a reconstructed frontal image from the new image. The transformation can be used for off-angle images having the same (e.g., within a range) gaze angle combination as that used to build the transformation.

In practice, the process can be repeated for multiple image pairs (e.g., having the same gaze angle combination). An average of the results as described herein can be taken to generate a generalized transform.

Example 24

Exemplary Optical Flow Method

Figure 17:
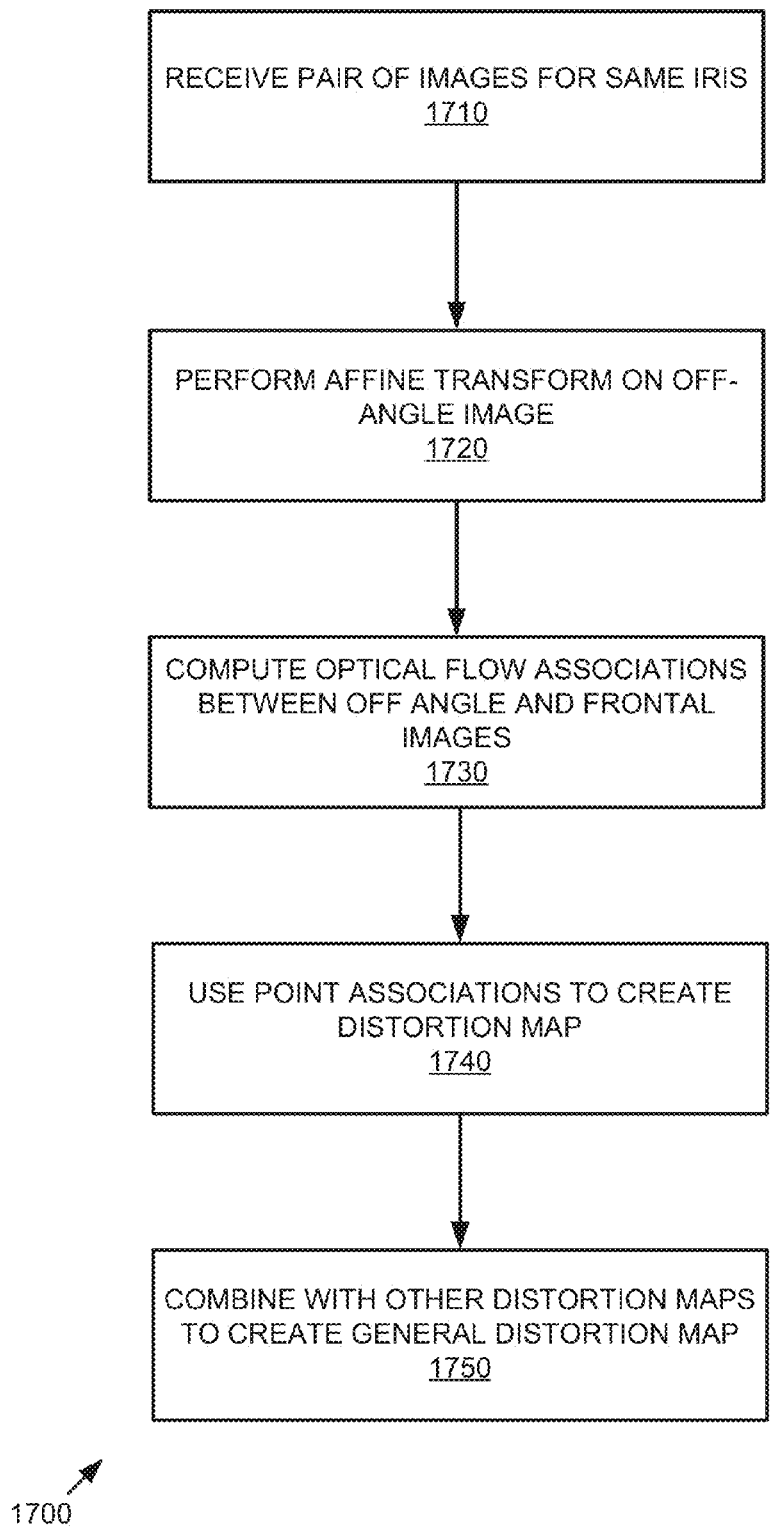
FIG. 17 is a flowchart of an exemplary method of creating a general distortion map via measuring optical flow between images.

FIG. 17 is a flowchart of an exemplary method 1700 of creating a general distortion map via measuring optical flow between images and can be implemented, for example, in the system such as that shown in FIG. 16.

At 1710, pairs of images (e.g., for the same iris) are received as shown in FIG. 16. At 1720, an affine transform is performed on the off-angle image as described herein. Additional processing, such as stretching and the like can be performed.

At 1730, optical flow association is computed between the off-angle and frontal images. Textures in the iris can be used as reference points within the images.

At 1740, point associations are used to create a distortion map.

At 1750, the distortion map is combined with other distortion maps to generate a general distortion map.

As described herein, the distortion map can then be used to reconstruct a frontal view of an iris depicted in an off-angle image (e.g., having the same gaze angle combination as those used to build the distortion map).

Example 25

Exemplary Genetic Algorithm System

Figure 18:
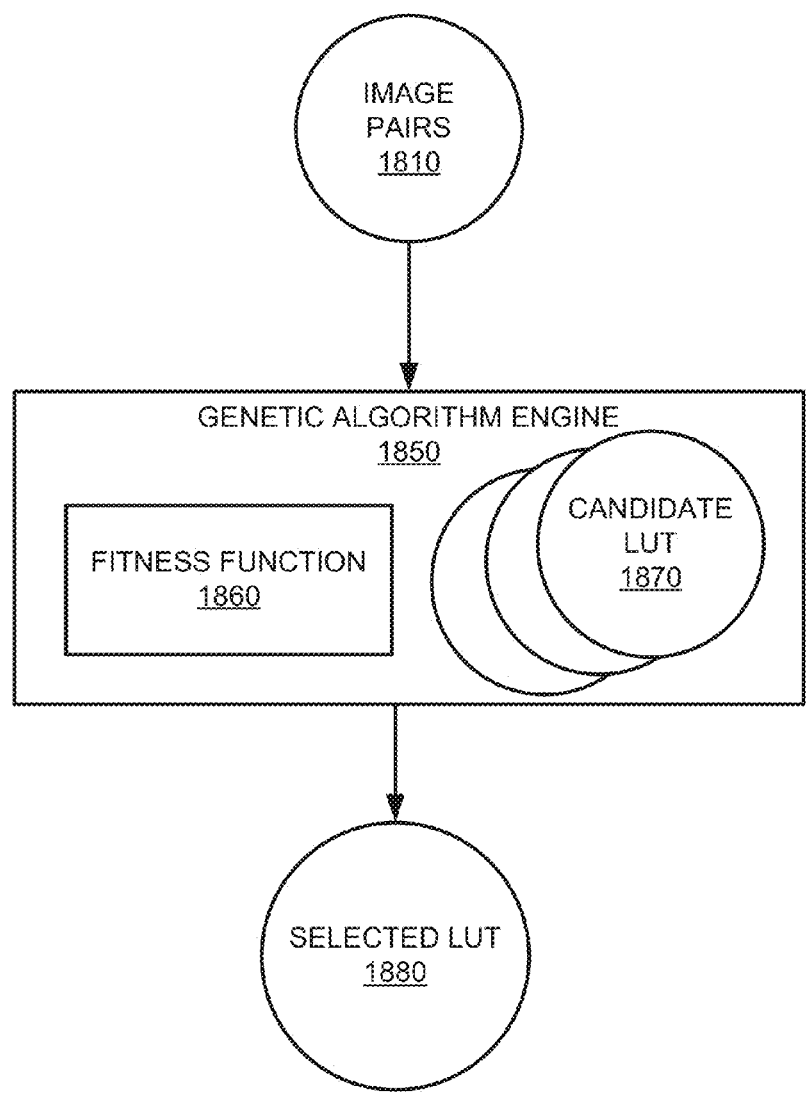
FIG. 18 is a block diagram of an exemplary system producing a selected look-up table for reconstructing frontal images based on a genetic algorithm.

FIG. 18 is a block diagram of an exemplary system 1800 producing a selected look-up table for reconstructing frontal images based on a genetic algorithm.

In the example, image pairs 1810 are received. As in the other examples, a given pair in the image pairs 1810 is captured using the same iris. One image in the pair is a frontal view, and the other is an off-angle image of the same iris having a given combination of gaze angles.

The genetic algorithm 1850 includes a fitness function 1860 that measures how well an individual transform (e.g., candidate look-up table 1870) performs in successfully reconstructing a frontal view of the off-angle image in the pair. The fitness function 1860 can indicate if (e.g., how well) the reconstructed frontal view is recognized as matching the actual frontal view. An average Hamming distance technique can be used.

After iterating a desired number of times, the genetic algorithm engine can output one or more selected look-up tables 1880 that can then be used as transforms to reconstruct frontal views of off-angle images (e.g., having the same gaze angle combination as those used to build the transform).

Example 26

Exemplary Genetic Algorithm Method

Figure 19:
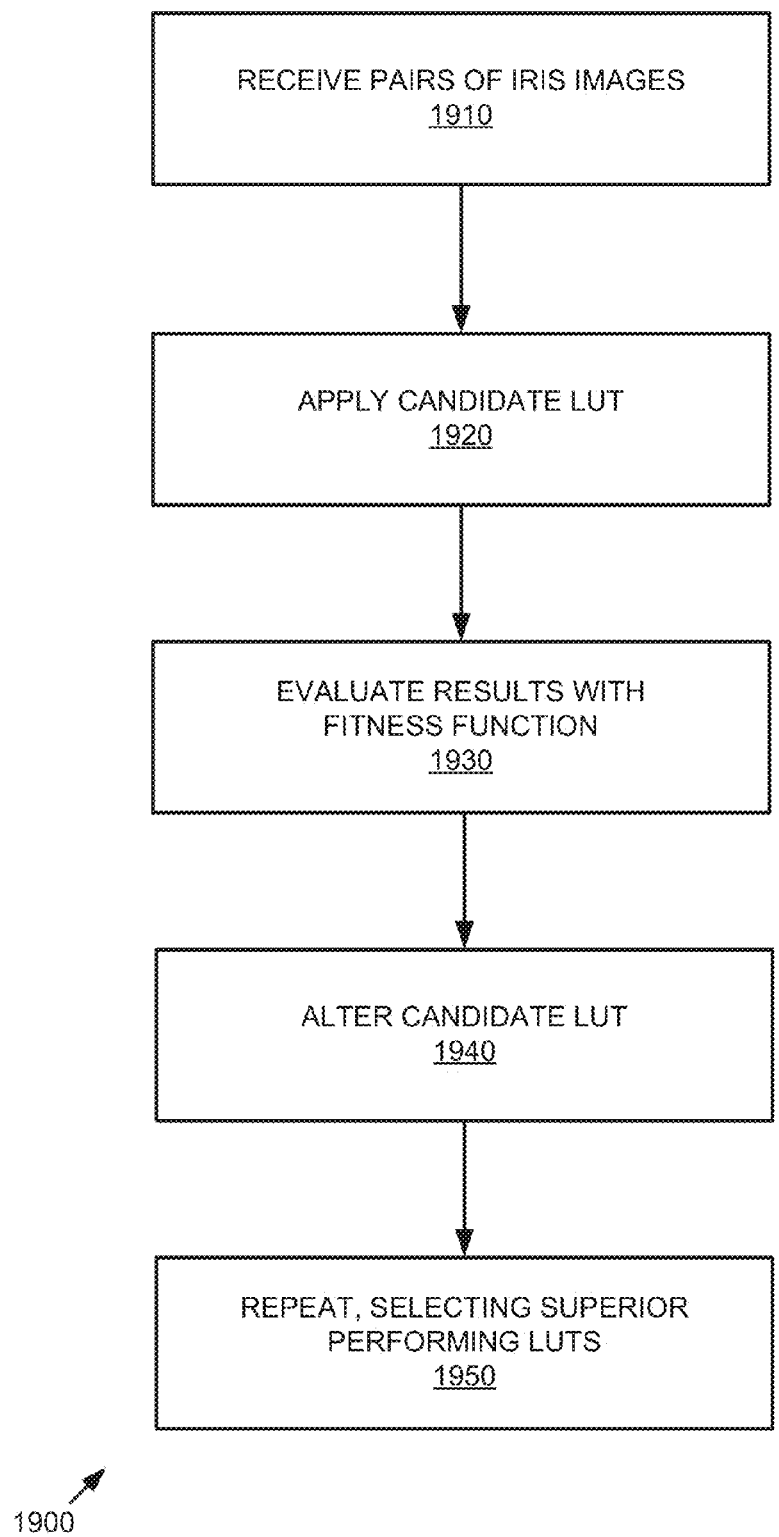
FIG. 19 is a flowchart of an exemplary method of producing a selected look-up table for reconstructing frontal images based on a genetic algorithm.

FIG. 19 is a flowchart of an exemplary method 1900 of producing a selected look-up table for reconstructing frontal images based on a genetic algorithm and can be implemented, for example, in the system of FIG. 18.

At 1910, pairs of iris images for the same iris are received.
At 1920, a candidate look-up table (e.g., individual in the genetic algorithm) is applied to the off-angle image. An affine transform can also be involved as described herein.

At 1930, the results are evaluated with a fitness function as described herein.

At 1940, the candidate look-up table is altered (e.g., mutated or the like) according to the genetic algorithm.

At 1950, the process can be repeated, and superior performing look-up tables can be chosen for inclusion in subsequent iterations.

Example 27

Exemplary Ray-Tracing Implementation: Overview

Iris recognition has been proven to be an accurate and reliable biometric. However, the recognition of non-ideal iris images such as off-angle images is still an unsolved problem. One solution comprises a new biometric targeted eye model and a method to reconstruct the off-axis eye to its frontal view allowing for recognition using existing methods and algorithms. Such a solution allows for existing enterprise level algorithms and approaches to be largely unmodified by using the implementation as a preprocessor to improve performance. In addition, the implementation accounts for the 'Limbus effect' and its importance for an accurate segmentation of off-axis irises. The implementation uses an anatomically accurate human eye model and ray-tracing techniques to compute a transformation function, which reconstructs the iris to its frontal, non-refracted state. Then, the same eye model is used to render a frontal view of the reconstructed iris. Results from synthetic data are shown to establish an upper limit on performance improvement and establish the importance of the implementation over traditional linear elliptical unwrapping methods. Results with synthetic data demonstrate the ability to perform an accurate iris recognition with an image taken as much as 70 degrees off-axis. The features of the described ray-tracing implementation can be incorporated into any of the examples herein.

Example 28

Exemplary Ray-Tracing Implementation: Introduction

Figure 20:
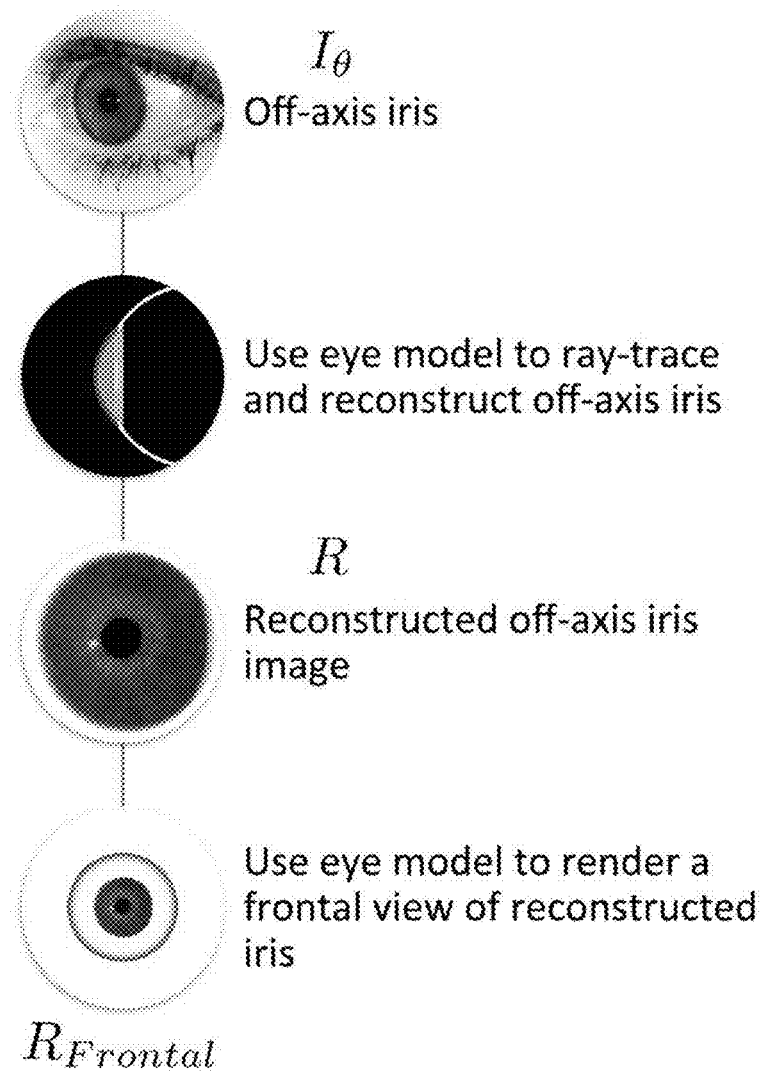
FIG. 20 is an exemplary workflow for use with a ray-tracing implementation.

FIG. 20 shows an exemplary workflow of a recognition process for use with the ray-tracing implementation. Given a camera configuration (e.g., focal length, sensor size, distance from iris to camera, gaze, etc.), the eye model can be used for two tasks: 1) Compute a general non-rigid transformation T{•} used to reconstruct the iris from off-axis and refraction deformations. The term "reconstructed" is used rather than "corrected," because T{•} transforms the off-axis iris to its frontal view and without the refraction generated by the cornea and aqueous humor. 2) Render a frontal view of the reconstructed iris. The reconstructed iris is refracted by the cornea and aqueous humor model, so it can be matched within a gallery of eyes. This allows a seamless integration of the solution with current iris recognition pipelines Example 29

Exemplary Ray-Tracing Implementation: Eye Model

Figure 21:
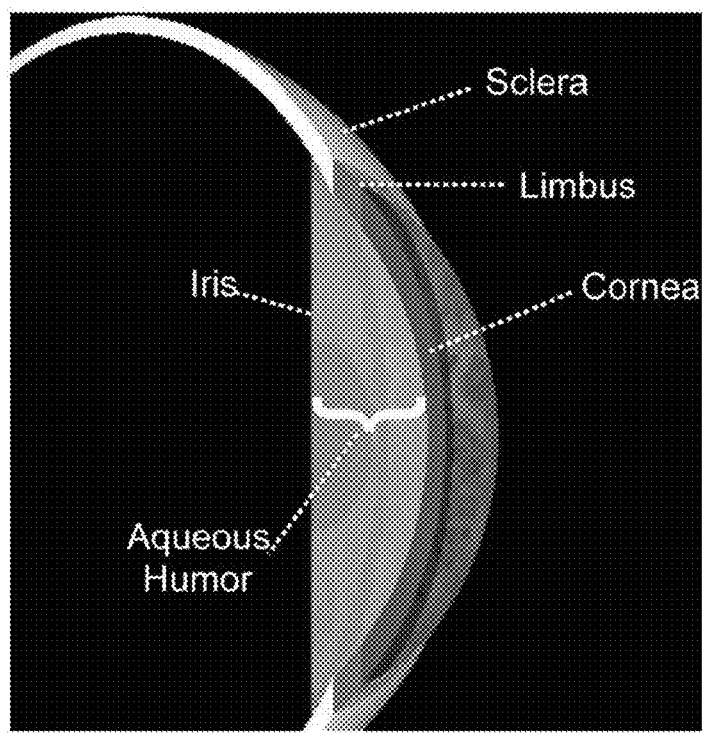
FIG. 21 is an illustration of components of a generalized eye model.

A generalized eye model for use in biometrics systems, including the technologies described herein is based on components of the eye as shown in FIG. 21. The geometry approximates the eye anatomy, while maintaining a lifelike appearance. The model is sometimes called the "ORNL Eye." As shown in FIG. 21, the ORNL Eye models the visible components of the eye pertinent to iris recognition: the cornea, aqueous humor, limbus, iris, and sclera. Such are the primary components relevant to iris recognition.

The technologies described herein can work with a variety of eye modeling techniques. For example, the model can incorporate aspects from other anterior cornea and posterior cornea models (e.g., see Liou et al., "Anatomically accurate, finite model eye for optical modeling," *J. Opt. Soc. Am. A*, 14(8):1684-1695, August 1997; Navarro et al., "Optics of the average normal cornea from general and canonical representations of its surface topography," *J. Opt. Soc. Am. A*, 23(2): 219-232, February 2006; and others).

The parameters to model a left eye are summarized in Table 1. For the cornea anterior and posterior surfaces, $R_x$ and $R_y$ are the radius of curvature in the horizontal and vertical direction, respectively. Similarly, $Q_x$ and $Q_y$ are the aspheric constants in the corresponding direction. After the aspheric shape is defined, the component is translated by $[x_0, y_0, z_0]$, and then rotated by $[\alpha, \beta, \gamma]$ degrees around the x-, y-, and z-axis, respectively. For the right eye x=−x. For a 550 nm wavelength, the Index Of Refraction (IOR) of the cornea and aqueous humor is 1.377 and 1.339, respectively. The IOR for those components decreases as the wavelength increases. Imaging for iris recognition is done in the near-infrared range. Therefore, the IOR of the cornea and aqueous humor was reduced to 1.37 and 1.33, respectively, to resemble the refraction of near-infrared rays.

TABLE 1

Overview of the ORNL Eye model parameters for the left eye

| Parameters | Values |
|---|---|
| Cornea anterior (mm) | $R_x = 7.63$, $R_y = 7.4$, $Q_x = -0.465$, $Q_y = -0.481$, $x_0 = -0.27$, $y_0 = -0.035$, $z_0 = -12.64$ $\alpha = 0.85°$, $\beta = -2.35°$, $\gamma = -0.02°$ |
| Cornea posterior (mm) | $R_x = R_y = 6.4$, $Q_x = Q_y = -0.26$, $x_0 = y_0 = Z_0 = 0$ $\alpha = -0.85°$, $\beta = 3.05°$, $\gamma = 0.02°$ |
| Cornea thickness, radius, and IOR | $\Delta = 0.536$ mm, $R = 6.3$ mm, and IOR = 1.37 |
| Aqueous humor depth and IOR | ACD = 3.16 mm and IOR = 1.33 |
| Iris radius, sclera radius, and limbus length (mm) | 6.35, 11.5, and 0.6 |

As described herein, aspherical eye models can be supported. Based on a standard formula for aspheric lenses, a corneal can be designed such that the kappa (k, conic constant) term can be between −1<k<=0.

A generic cornea need not have any correction terms, but correction terms can be added to account for anomalies on a subject's cornea for a customize eye model.

Standard equations for defining aspheric lenses are as follows:

$$Z(s) = \frac{Cs^2}{1 + \sqrt{1 - (1+k)C^2 s^2}} + A_4 s^4 + A_6 s^6 + A_8 s^8 + \ldots$$

Where
Z=sag of surface parallel to the optical axis
s=radial distance from the optical axis
C=curvature, inverse of radius
k=conic constant
$A_4, A_6, A_8 = 4^{th}, 6^{th}, 8^{th} \ldots$ order aspheric terms
and $$Z(\rho) = \frac{C_{bfs}\rho^2}{1 + \sqrt{1 - C_{bfs}^2 \rho^2}} + u^4 \sum_{m=8}^{M} a_m Q_m^{con}(u^2)$$

Where
$C_{bfs}$=curvature of best fit sphere
$\rho$=radial distance from the optical axis
$u=\rho/\rho max$
$Q_m^{con}$=orthonormal basis of asphere coefficients
$a_m$=normalization term
The first term defines the aspheric shape, and the remaining terms (summation) define the anomalies in the aspheric shape, such as astigmatism.

Example 30

Exemplary Ray-Tracing Implementation: Limbus Effect

Figure 22A:
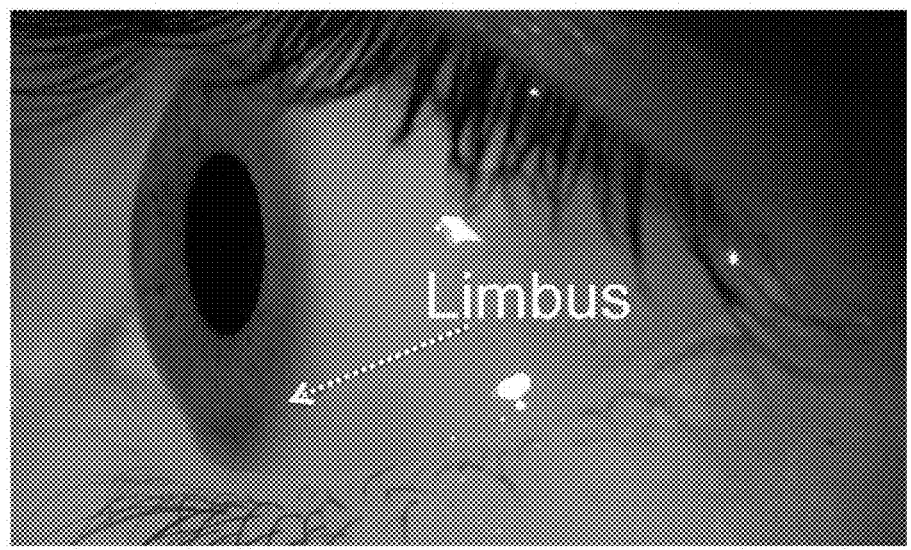
FIGS. 22A-B are illustrations of the limbus.
Figure 22B:
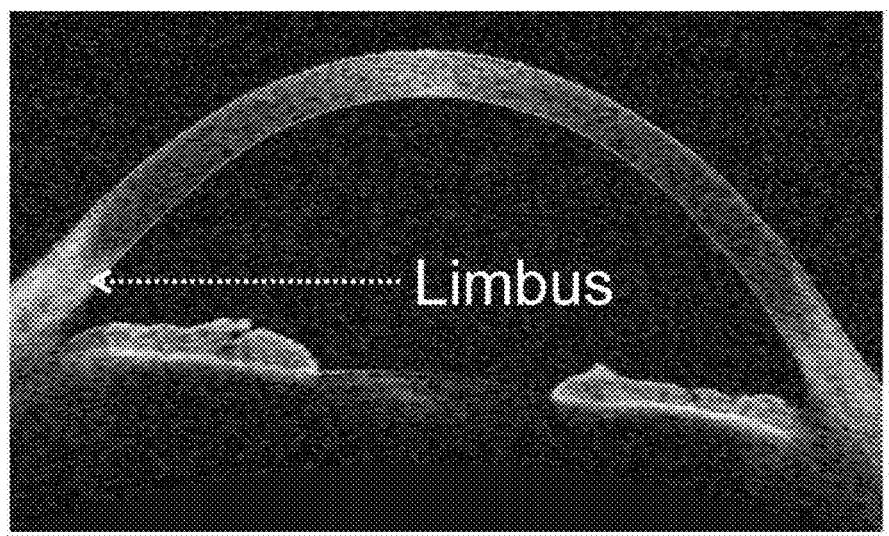

Accurate off-axis iris recognition requires understanding the role of the limbus effect. As shown in FIGS. 22A-B, the limbus is a semi-transparent member of the eye that changes from opaque at the boundary with the sclera to totally transparent at the boundary with the cornea. An assessment of Optical Coherence Tomography (OCT) images, as shown in FIG. 22B, indicates that the limbus significantly occludes regions of the iris for off-axis images beyond 25°. The phenomena can be called the 'limbus effect'.

As shown in FIG. 14, the entire iris is never truly visible because at any angle, even frontal, some of the iris is occluded by the limbus. When viewing the iris from the same angle, such as frontal, the same portion of the iris is always visible resulting in no depreciation in iris recognition performance. However, off-angle iris imaging can result in a significant decrease in recognition performance due to what is essentially a segmentation problem.

Figure 23A:
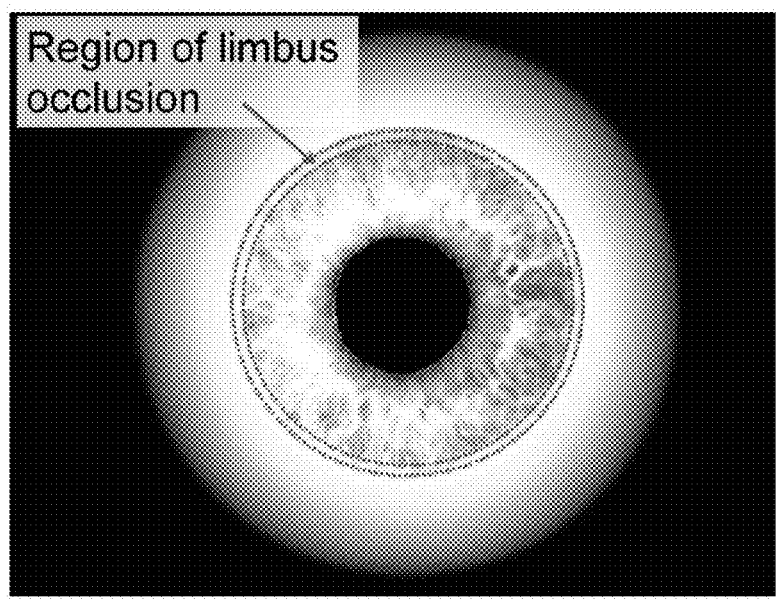
FIG. 23A-C are a rendering of an eye model at 0 degrees and unwrapping results.
Figure 23B:
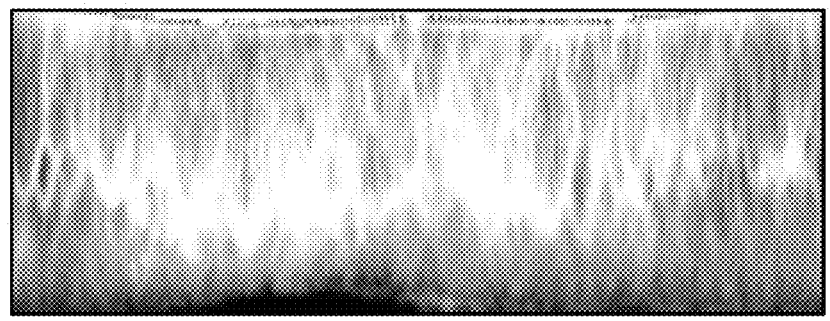
Figure 23C:
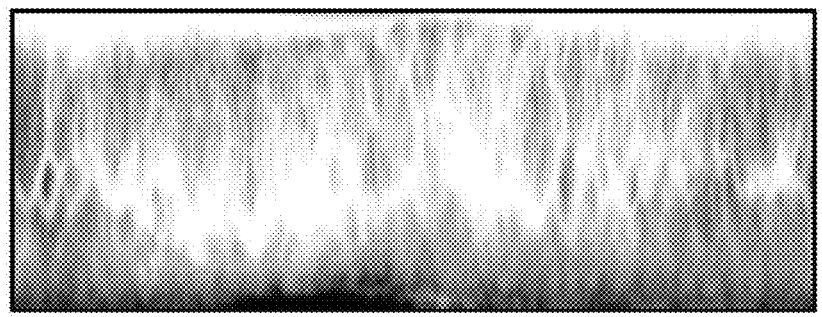

FIG. 23A is a rendering of the ORNL Eye at 0 degrees. The region between dashed lines is occluded by the limbus. Unwrapping results for the eye in FIG. 23A are shown in FIG. 23B overlooking the limbus effect, and FIG. 23C takes the limbus effect into account.

Conventional iris segmentation practices assume that the iris is not occluded by the limbus. Therefore, such solutions incorrectly assume that the iris starts at the fuzzy boundary shared by the cornea and limbus. The incorrect segmentation will produce an unwrapped iris with some regions of the texture stretched (See FIG. 23B). On the other hand, when the limbus effect is taken into account, the unwrapped iris is at the correct scale (See FIG. 23C), the occluded areas can be removed from the iris code, and a similarity can be better estimated. For the synthetic example in FIG. 23, overlooking the limbus effect resulted in a Hamming distance of 0.3854, while considering the limbus effect produced a path length Hamming distance of 0.0190. The limbus effect causes a significant portion of the degradation of traditional off-axis iris recognition performance.

Example 31

Exemplary Ray-Tracing Implementation, Computing T{•}

The ray-trace model can be composed of an eye from an unknown individual and a camera (See FIG. 13). The parameters for ray tracing can include: an optical eye model, the camera focal length, the camera sensor size, distance from camera sensor to the eye iris, and horizontal and vertical gaze angles (i.e., the angle between the camera axis and optical axis of the eye). For testing, the ray-tracing parameters can be known or determined, the ORNL Eye model can be used as a model to fit real eyes, gaze changes can be in azimuth (θ) alone, and the eye can be assumed as illuminated from all directions (i.e., no illumination fluctuations). In addition, to simplify, the iris can be centered at the origin, and the camera axis can be assumed to intersect the camera focal point, the center of the camera sensor, and the origin.

Traced rays start at the camera focal point fp. For each camera sensor pixel $p_i$, a ray $fp+t(p_i-fp)$ is traced. Procedure 1 shown in FIG. 24 is called with the initial parameters $p_0=fp$, $dir=p_i-fp$, and $trace=\emptyset$ (i.e., empty set). The rays are traced as follows:

1) The closest ray-object intersection point inter is computed (Line 3). If the intersection point is found, the intersected object ID obj and surface normal norm are returned; otherwise norm=0.

2) If the intersecting object is transparent, a refraction ray is computed; otherwise, the direction of the refraction ray has magnitude zero (Line 5).

3) The procedure is called recursively for each refracted ray (Line 6). Observe that the recursive calls stop if no intersection is found or the intersecting ray is opaque.

4) The set trace keeps track of the intersections in the trace (Lines 2 and 9). However, only the traces that reached the iris are kept for further processing (Line 10).

The traces computed above map a subset of the sensor pixels to the corresponding iris pixels. It is possible that multiple sensor pixels map to the same iris pixel. The issue is resolved by obeying Fermat's law. From a set of N candidate traces, one wants to keep the trace, with the shortest path length $$PathLength_j = \sum_{i=1}^{K} n_i \|p_i p_{i-1}\|,$$

where $j \in \{1, \ldots, N\}$, K is the number of intersections in trace, $p_i \in$ trace, $p_0=fp$, $n_i$ is the IOR for the material intersecting the segment with endpoints $p_{i-1}$ and $p_i$, and $\|p_i p_{i-1}\|$ is the points' Euclidian distance. Finally, T{•} is a non-rigid transformation function with a 1-to-1 correspondence between the pixels at the iris plane and the pixels at the image plane (i.e., the camera sensor). The resulting non-rigid transformation is an iris image without refraction and off-axis deformations. Note that a new calculation of T{•} may be advised for any change in the configuration of the camera (e.g., focal length, sensor size, location, etc.) or the position of the eye with respect to the camera.

T{•} defines a transformation in Euclidean space (i.e., $p_i \in \mathbb{R}^3$). However, images are represented in pixel coordinates (i.e., $[i,j] \in \mathbb{Z}_{\geq 0}^2$). Therefore, an appropriate quantization of the coordinates in T{•} is required in order to map the iris image to the iris plane. For example, when mapping an iris image θ degrees off-axis, the image plane coordinates in T{•} are rotated −θ degrees, and then, the coordinates are discretized accordingly to the image pixel space.

Example 32

Exemplary Results with Ray-Tracing Implementation

Figure 25:
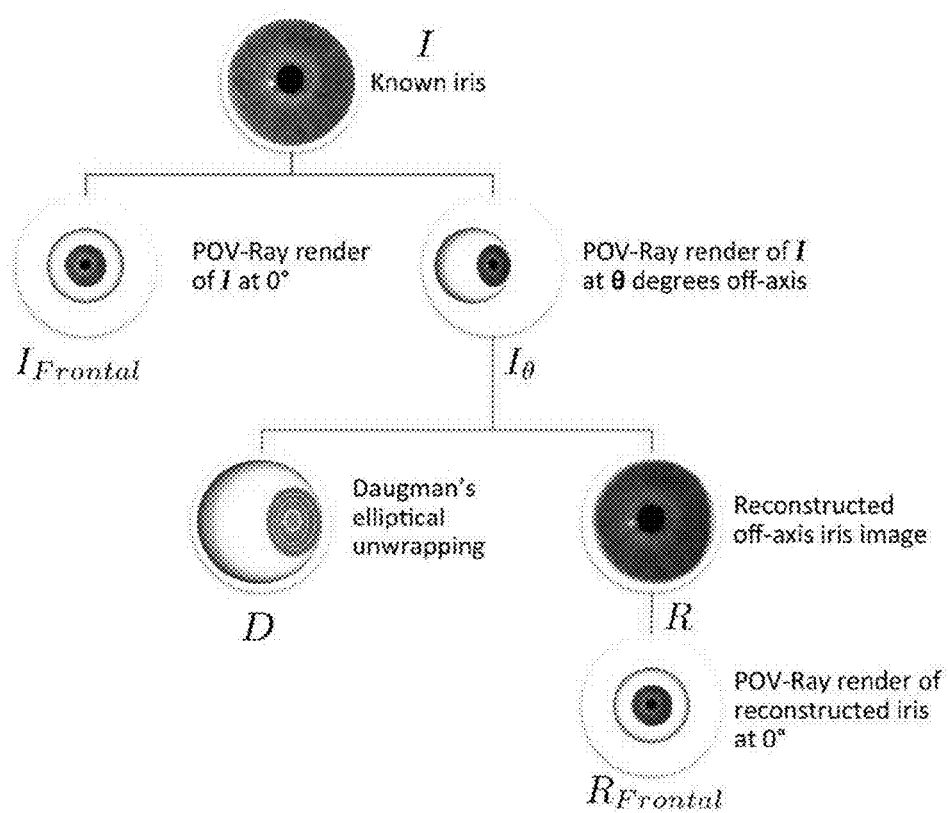
FIG. 25 is a flowchart of a process for comparing synthetic data.

The geometry of the human eye varies across individuals. Therefore, using a synthetic eye to test the implementation is helpful and establishes a possible upper limit of what improvement is possible on real world data. FIG. 25 shows a flowchart for the simulations. A known iris (I) is integrated into the eye model. A frontal view of the synthetic eye ($I_{Frontal}$) is rendered in POV-Ray (Persistence of Vision Raytracer freeware available at the POV-Ray website at www.povray.org). $I_{Frontal}$ represents an eye from a gallery of irises. Then, off-axis renderings of the eye model ($I_\theta$) are generated. Each $I_\theta$ represents a probe iris. The off-axis probe iris is reconstructed (R) and integrated into the eye model. A frontal view of the reconstructed iris ($R_{Frontal}$) is rendered in POV-Ray. Finally, the Hamming distance between $I_{Frontal}$ and $R_{Frontal}$ is computed.

The synthetic iris used is from an actual frontal iris image. The iris was integrated into the eye model as specified in Table 1. In addition, the camera model has a sensor size of 24.58 mm×18.43 mm, pixel size of 6 μm, and focal length of 130 mm. Finally, the distance from the camera to the iris was set to 290 mm.

Figure 26:
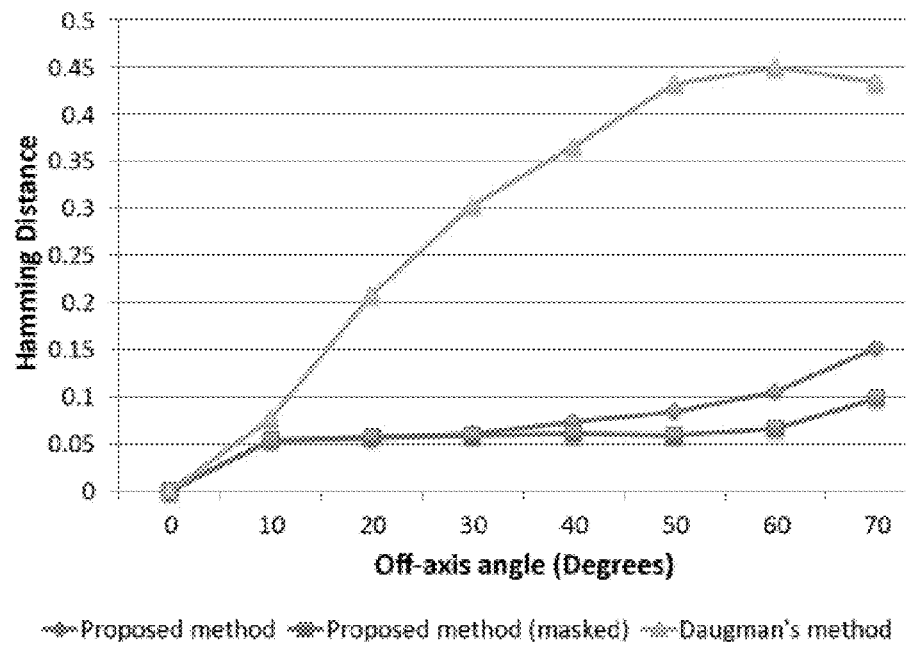
FIG. 26 is a chart showing results for an implementation of the technologies.

FIG. 26 shows the results when measuring the Hamming distance of a single off-axis synthetic iris with the ray-tracing implementation and a traditional Daugman elliptical method (e.g., as described in Daugman. "Probing the uniqueness and randomness of iriscodes: Results from 200 billion iris pair comparisons," *Proceedings of the IEEE*, 94(11):1927-1935, November 2006.). The recognition approach of both is the same, but a preprocessing step has been added that improves the unwrapped image. As a baseline, the gallery eye $I_{Frontal}$ and the off-axis probe $I_\theta$ were compared as follows: 1) A segmentation phase yields two elliptical boundary regions representing the iris and pupil. 2) The normalization phase applies an elliptic unwrapping that samples the iris image with respect to the iris center. This step accounts for iris eccentricity, shifted centers, and rotation by altering the sampling pattern during normalization. 3) Then, OSIRIS's phase-quadrant demodulation is used to generate the iris codes. OSIRIS is an open source for iris reference system available as part of the BioSecure Project website at www.biosecure.info.

For the implemented method, FIG. 26 shows the results for masked and unmasked iris code experiments. For the unmasked experiment, segmentation masks were manually generated. These masks remove (e.g., from the iris codes) region(s) of the iris that contain no information due to occlusions of the limbus, specular reflections, and eye lids, or reflections at the cornea. This allows a virtually noiseless comparison of $I_{Frontal}$ and $R_{Frontal}$. On the other hand, for the masked results, each gallery and probe eye was segmented similarly to the elliptical unwrapping results. However, the iris segmentation of the $I_{Frontal}$ was used for all the probes. This represents a comparison under non-ideal conditions, in particular for steepest angles. The masked results represent the best case scenario (i.e., upper limit for using the proposed result to correct for off0angle iris recognition).

The Daugman method results in FIG. 26 refer to the comparison of $I_{Frontal}$ and D in FIG. 25. Similarly, the "proposed method" results refer to a comparison of $I_{Frontal}$ and $R_{Frontal}$ in FIG. 25. The implemented technique clearly outperforms the traditional method. For the masked and unmasked results, a significant performance difference arises for irises with an off-axis angle greater than 30°, because it is beyond 30° that iris information is lost due to refraction deformations, limbus occlusions, and reflection.

The results show that the implemented method can accurately reconstruct an off-axis iris. The results demonstrate the efficacy of the process, the impact of off-angle iris performance degradation, and documents the impact of the limbus effect on off-angle iris performance.

Example 33

Exemplary Transforms Adjusting Images to Frontal View: Overview

Other ray-tracing solutions can be implemented, and transformations can be created that adjust off-angle images to frontally acquired ones. One ray-tracing solution implements an eye model to simulate corneal refraction effects. Using the model, ray tracing is performed to calculate transforms to remove refractive effects in off-angle iris images when reprojected to a frontal view. The correction process is used as a preprocessing step for off-angle iris images for input to a commercial matcher. With the implementation, a match score distribution mean improvement of 11.65% for 30 degree images, 44.94% for 40 degree images, and 146.1% improvement for 50 degree images is observed versus match score distributions with unmodified images.

Example 34

Exemplary Transforms Adjusting Images to Frontal View: Introduction

The eye is composed of complex three-dimensional structures that are imaged in two dimensions for recognition purposes. When images are acquired from the same angle, this does not present a significant problem because the same projection of the three-dimensional shape is viewed for the cases. However, when the structures are viewed from different angles, the appearance of the two dimensional projections into an image may change drastically. The effect is further complicated by slight variations of eye anatomy between people.

The cornea is a biological lens that focuses incoming light through the pupil so that it hits the fovea. The lensing refracts light rays that enter or leave the cornea. Because similar refractions are uniformly present in acquired images, imaging only frontally oriented eyes mitigates effects that may arise from the lensing of the cornea. When one attempts to recognize iris images acquired from multiple gaze angles, however, the cornea is viewed from different angles, causing distortion of the underlying iris texture. The distortion is non-uniform and is typically not completely correctable via affine transforms.

An eye model can be used to create transformations that adjust off-angle images to appear as if they were frontally acquired. Because the transformations are created by ray tracing the model with the cornea, they account for the corneal refractions.

An eye model can be used to create transformations that adjust off-angle images to appear as if they were frontally acquired. Because transforms can be created by ray tracing the model with the cornea, they can account for the corneal refractions.

The corneal refraction correction transforms defined through ray tracing a biologically inspired eye model can be implemented to improve iris recognition. The transforms are applied as a preprocessing step to transform off-angle iris images to appear as if they were frontally acquired. After performing the preprocessing step, a significant improvement using a commercial iris matcher was observed.

In off-angle iris recognition, the iris and pupillary boundaries no longer appear circular.

Example 35

Exemplary Transforms Adjusting Images to Frontal View: Further Information

An eye model can be useful in correcting for corneal refractions in off-angle iris images, and occlusion by the limbus can be modeled. Although models can assume a planar iris, it is possible to add some depth shape to the iris in order to account for lens accommodation and particularly if a customized eye model is used to recognize a subject. Thus, the 3D shape of the iris can also be accounted for.

Determining horizontal and vertical gaze angles of the eye can be accomplished using correlated elliptical segmentation information to provide estimates based on the parameters of the segmentation ellipses.

Example 36

Exemplary Transforms Adjusting Images to Frontal View: Eye Model

Any of the eye models described herein can be used. Quadric surfaces can be used to model the shape of the anterior and posterior corneal layers. The anterior cornea can be defined and posterior cornea can be modeled according to an appropriate shape (e.g., see Liou et al., "Anatomically accurate, finite model eye for optical modeling," *J. Opt. Soc. Am. A*, 14(8):1684-1695, August 1997; Navarro et al., "Optics of the average normal cornea from general and canonical representations of its surface topography," *J. Opt. Soc. Am. A*, 23(2): 219-232, February 2006; Price, "On the efficacy of correcting of refractive effects in iris recognition," In *Computer Vision and Pattern* Recognition, 2007, IEEE Conference on CVPR '07, pages 1-6, 2007, all three of which are incorporated by reference; and others). The radius of curvature of the sphere used (6.5 mm) can be determined via a Gullstrand-LeGrand model (e.g., see Le Grand, *Form and Space Vision*, Indiana University Press, 1967). The indices of refraction used for the anterior and posterior cornea boundaries can be 1.36 and 1.33. Exemplary implicit equation quadric coefficients for the two shapes are shown in Table 2. For the cornea surfaces, the corneal thickness at the apex is 0.5 mm. The normal vector at the apex of the anterior cornea points in the positive z direction.

TABLE 2

Cornea quadric Coefficients

| Layer | A | B | C | D | E |
|---|---|---|---|---|---|
| Anterior | 1 | 1.0318 | 0.536 | −0.0006 | −0.038 |
| Posterior | 1 | 1 | 1 | 0 | 0 |

| Layer | F | G | H | I | J |
|---|---|---|---|---|---|
| Anterior | −0.0147 | 0.06 | −0.115 | 13.546 | −23.25 |
| Posterior | 0 | −0.0014 | −0.1344 | 10.7726 | −13.2331 |

The iris is modeled as a plane located underneath the corneal layers. A model can contain an iris plane with a normal vector aligned with that of the center of the anterior cornea, or the iris plane can have a configurable tilt to align with the apex of the anterior cornea and account for deviations between the observed optical axis of the eye and the visual axis. For the described experiments, the tilt was set to −2.5 degrees about the y-axis. The plane is placed in the model to yield an anterior corneal depth of 3.6 mm.

The limbus can be modeled as completely opaque, which is an approximation. The limbus can exist completely within the corneal layers and be determined by intersecting a plane with the surfaces of the cornea. Any parts of the corneal surfaces located between the limbus plane and the iris plane can be considered to be the opaque limbus. For the described experiments, the limbus plane is parallel to the iris plane and located 0.5 mm above it.

The parameters of the model used here—most notably the anterior cornea shape and iris plane tilt—can be designed to model the left eye. In order to model the right eye, the model can be flipped about the yz-plane. Further, the eye can be built as a generalized model. Differences between the eyes of any person and the model are likely to exist, and personalized eye models can be used.

Example 37

Exemplary Transforms Adjusting Images to Frontal View: Computing the Refraction Correction POV-Ray can be used to trace rays from the camera's sensor to the iris plane of the eye model. Or, a simple ray tracer (e.g., written in a programming language such as C++ or the like) can merely report intersections with objects and refracts upon intersection with an object. Because objects in the model can be defined as quadrics and planes are simply a degenerate quadric surface, the intersection of a ray with a shape has a well-defined closed form. Simple refractions of rays can be determined without determining reflections and material properties to eliminate complexities.

The tracing process can proceed as shown in FIG. 13. The scene in the ray tracer can be setup to mirror the acquisition scenario. The properties of the camera used in acquisition can be used to create a point camera in the ray tracer. The camera can have a focal length of 150 mm and a focal point of 340 mm from the center of the eye along the positive z-axis. The sensor size and pixel size can be set to match the acquisition camera. For pixels in the sensor, rays are defined that intersect the center of the pixel and the focal point. The ray is traced through the scene until it intersects the iris plane, refracting at the surfaces of the cornea along the way. Once it contacts the iris plane, the sensor point and the resulting iris plane point are stored.

Once the tracing process is complete, a mapping can be determined between points on the iris plane and image data on the sensor with refraction taken into account. An image of the iris without refraction effects (referred to as "the unrefracted iris") can be created by discretizing the iris plane into pixels and filling in values from the sensor. If pixels from the sensor image trace to the same pixel in the iris plane, the iris plane pixel is filled with the value of the sensor pixel whose ray traveled the shortest distance (e.g., using Fermat's principle). After the conflicts are resolved, a mapping can be determined between the pixels of an unrefracted iris image and an acquired sensor image. The mapping between the unrefracted image and the sensor image is one-to-many respectively. Many sensor pixels may image the same unrefracted iris pixel, but the value of an unrefracted iris pixel is determined by only one sensor pixel.

With the unrefracted iris image, one has created an iris image that appears to have been imaged frontally without the effects of the corneal refractions. However, even frontal images used for recognition are not acquired without refraction distortions. In order to match against previously acquired unmodified frontal images, the unrefracted iris can be distorted to appear as if it were imaged frontally. A second mapping is created, this time between an on-axis eye and the sensor. With the mapping, a frontal image with corneal refraction effects (e.g., FIG. 27C) can be made from the unrefracted iris image. The process can be outlined as follows:

1. Trace an off-angle eye (e.g., comprising an iris image) with some vertical gaze, $\theta_v$, and some horizontal gaze, $\theta_h$.
2. Extract the mapping $T_{\theta_v, \theta_h}$ between the unrefracted iris and off-angle image.
3. Trace the eye with no vertical and horizontal gaze.
4. Extract the mapping $T_0$ from between the unrefracted iris and frontal image.
5. Compose the two transforms to create a mapping $T_{\theta_v, \theta_h \to 0}$ between the frontal and off-angle images.
6. Apply the transform $T_{\theta_v, \theta_h \to 0}$.

The transform, $T_{\theta_v, \theta_h \to 0}$, maps between the reconstructed frontal image and an acquired off-angle image given particular eye gaze estimates and only holds for such gaze values (e.g., different eye gaze values can use a different transform). To increase performance, the transforms, $T_{\theta_v,\theta_h \to 0}$, can be precomputed as a result for a large variety of gaze angles. For example, combinations of vertical gazes in a range at a vertical degree step with horizontal gazes in a range with a horizontal degree step can be computed. In experiments described herein, a vertical range of [−10, 10] with 1 degree vertical steps in combinations with horizontal gazes of [−20,−60] degrees with one degree horizontal steps were used because such data was present, but other combinations can be used.

Figure 27A:
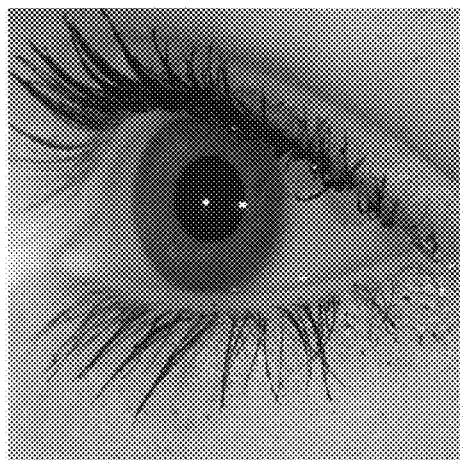
FIGS. 27A-C are images showing a process of transforming an image in accordance with the technologies.
Figure 27B:
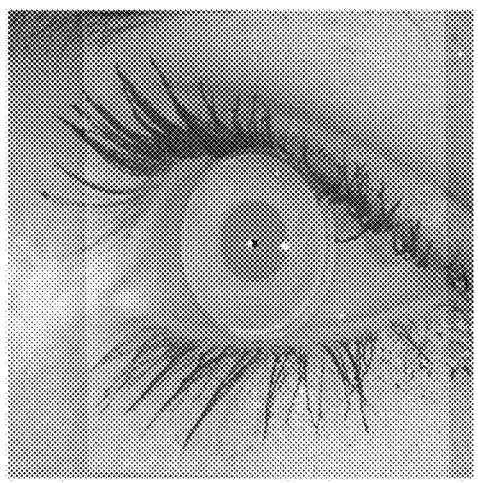
Figure 27C:
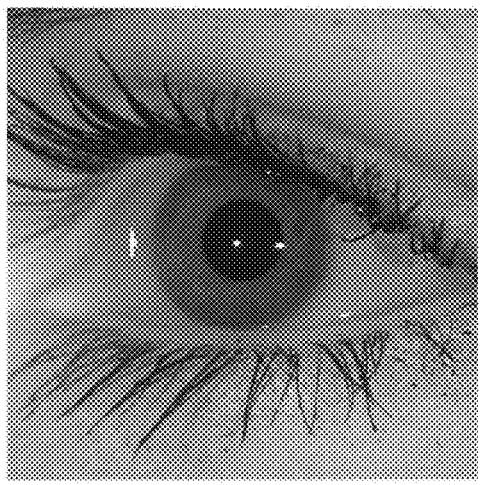

$T_{\theta_v,\theta_h \to 0}$ maps specific pixel locations from an off-angle image to a reconstructed frontal image. Deviance in size, position, or limbus shape of an acquired image with the traced eye for given gaze angles can introduce error. Accordingly, the acquired image can be scaled and translated to match the size and location of the eye model used to compute $T_{\theta_v,\theta_h \to 0}$ (FIG. 27B). A small rotation may be applied to the acquired image in order to align the axis of the iris with the eye model. Once the acquired eye aligns with the eye model for the given gaze angles, it may be reconstructed to frontal. FIG. 27 illustrates the process. FIG. 27A is the original acquired image. In FIG. 27B, the acquired image is aligned to the location and shape with that of the eye model. The shape location and shape expected by the eye model is shown with an overlay mask. FIG. 27C is the reconstructed frontal image.

Example 38

Exemplary Transforms Adjusting Images to Frontal View: Experiment

Refraction has been shown to be a factor that negatively impacts off-angle recognition, and correcting for it can greatly improve matching performance. The benefits of corneal refraction correction on the off-angle problem at extreme angles (e.g., greater than 30 degrees) can be shown. A utility of extreme angle correction is that existing recognition algorithms already perform very well on near frontal data. So, a refraction correction method can be used as a preprocessing step for off-angle probes. The reconstructed images can then be processed using a commercial recognition algorithm. Matching can be performed against a frontal gallery without image modification.

Example 39

Exemplary Transforms Adjusting Images to Frontal View: Experiment Data Set

The data set contains images of the left eyes of 25 subjects. Each subject was seated on a stool and told to place his or her head on a head rest and look straight ahead with the subject's eye aligned with the height of the camera. Using a mechanical platform, multiple images were acquired with the camera directly in front of the subject, 30 degrees to the subject's left, 40 degrees, and 50 degrees. Due to motion of the subjects' eyes outside of control, the actual eye gazes may deviate from these values.

From each of the camera positions, five images were chosen that had the best focus. In choosing the images, it was also attempted to minimize dilation differences between the different angles. This was done to isolate the results from dilation effects. With the images selected, the data set consisted of 125 images at each camera position.

The five frontal images for each subject were collectively taken as the gallery. The off-angle images were considered probes. From the probes, three sets were created:
1. Original: unmodified images
2. Reconstructed: the original images with the corneal refraction correction transformation applied.
3. Affine: using the gaze information, the original images rotated to a frontal alignment with an affine transform.

The third set, the affine set, was created in an attempt to isolate the improvements of the corneal refraction correction method and previous off-angle recognition attempts. Rotating the original images with an affine transformation based upon gaze information emulates other methods.

The probes from each of these sets are processed and matched against gallery images to yield the match and non-match distributions.

Example 40

Exemplary Transforms Adjusting Images to Frontal View: Matching Technology

In the experiment, the VeriEye 2.5 algorithm from the Neurotec Biometric 4.3 SDK was used. The algorithm claims robustness to off-angle irises.

The scores reported by the VeriEye matcher are similarity scores. The higher the score, the more likely it is that the two images are a match. From the matcher's documentation, the scores are designed so that a matching threshold can be easily set to yield a desired false accept rate (FAR). Scores less than threshold will be considered non-matches, and scores greater than or equal to the threshold would be matches. The provided formula for determining the matching threshold is $$\text{Threshold} = -12 \log_{10} \text{FAR}$$

In the experiment, images are processed by VeriEye to create a template. At this stage, some segmentation feedback is provided to the user. From this information, one can determine whether the segmentation is good. Because the experiment does not have control over the processes of the algorithm including segmentation, templates are accepted regardless of segmentation quality, but possible missed segmentation templates are recorded.

In an operational online context, a user would likely not have ability to determine the quality of the segmentation of a generated template. So, templates generated with segmentation errors can be treated as any other template. Such errors can be simply regarded as failures of the system. In rare cases, the algorithm may fail to create a template from the input image. If so, a 0 is used for all match and non-match scores. This value was chosen because a failure to acquire will not result in a true match, but also will not result in false match.

Example 41

Exemplary Transforms Adjusting Images to Frontal View: Experiment Results

A. Segmentation Errors and Failure to Acquire

Segmentation results are presented in Table 3. In the table, segmentation errors were not a significant issue for the 30 degree images. As the angle increases however, the algorithm has a more difficult time correctly segmenting the original unmodified images. The severity of the trend is not seen in the affine or reconstructed sets. Segmentation quality for these sets remains relatively good across gaze angles.

TABLE 3

Failure to Acquire Counts and Segmentation Errors

| Image Set | | FTA | Seg. Errors |
|---|---|---|---|
| Original | 30 | 0 | 2 |
| | 40 | 1 | 45 |
| | 50 | 0 | 95 |
| Affine | 30 | 0 | 0 |
| | 40 | 0 | 1 |
| | 50 | 0 | 0 |
| Refracted | 30 | 0 | 4 |
| | 40 | 0 | 3 |
| | 50 | 0 | 10 |

B. Score Distributions

Figure 28:
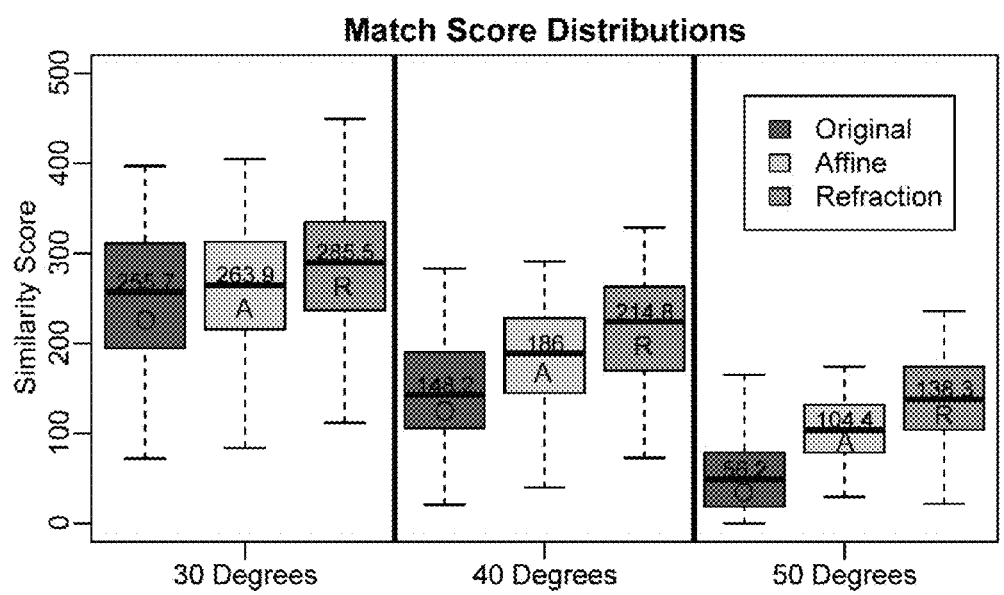
FIGS. 28 and 29 are charts showing distributions for an experiment using the technologies described herein.
Figure 29:
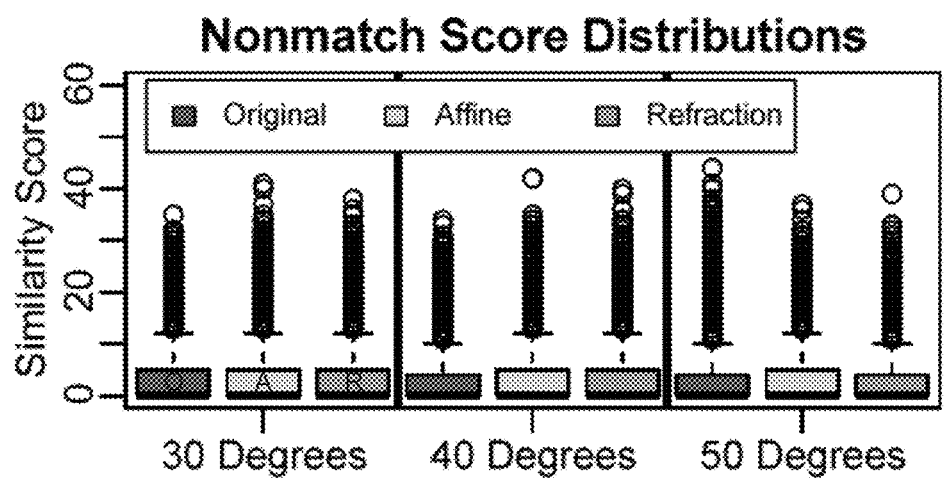

The scores for each probe image set are examined separately at each of the camera angles. The match and non-match distributions for these are shown in FIGS. 28 and 29. The box plot in FIG. 29 shows the non-match similarity score distributions of the sets are nearly identical across the angles. So, the match score distributions can be further analyzed.

As a summary statistic, the match score distribution mean improvement was calculated for the refracted set compared to the affine and original sets. These improvements are shown in Table 4. The values along with FIG. 28 show that a positive match score distribution shift occurs for the refracted image set across the gaze angles examined.

TABLE 4

Match score distribution mean improvements for Refracted Set

| | Refracted | | |
|---|---|---|---|
| | 30 | 40 | 50 |
| Original | 11.65% | 44.94% | 146.1% |
| Affine | 8.185% | 15.48% | 32.47% |

However, at a camera angle of 30 degrees, the match score distributions of the three probe subsets are similar. Referring back to Table 3, because few segmentation errors are present at the 30-degree camera angle, the similarities in the match score distribution indicate that the VeriEye algorithm may indeed handle a certain degree of off-angle gaze.

As the camera acquisition angle increases, larger differences between the three distributions are observed. The performance of the original set drops off sharply as the angle increases. The dropoff is likely due to the segmentation errors present when the templates are created. Nevertheless, the scores resulting from segmentation errors are treated the same as others because the algorithm still created a template for these probes. Due to the dropoff, the interesting comparison becomes the one between the affine transformed probe set and the reconstructed probe set.

Focusing on the affine and reconstructed sets for 40 and 50 degrees, it is apparent that the match score distributions of the reconstructed sets exhibit better performance than the affine transformed sets as evidenced by the 15.48% match score distribution mean increase for 40 degrees and 32.47% for 50 degrees.

Due to the non-match score distributions yielded from the data set and the degree of separation between the match and non-match distributions, the data itself indicates that the distribution improvements occur in such a range as to not affect ROC performance. However, though larger than previous work, the size of the data set is still limited, thus there can be a way of extrapolating the measurements to predict performance in an operational context.

C. Estimating ROC Performance

As noted, the VeriEye matcher was designed such that the scores represent a probability that two templates match. Further, guidelines are provided to choose a matching decision threshold that will likely yield a certain false accept rate in an operational context. Given a predicted false accept rate, pFAR, the threshold can be calculated according to the provided formula, above, for determining the matching threshold. By solving the equation for the predicted false accept rate, it is possible to determine the rate given the matching threshold of the matcher.

$$pFAR = 10^{-Threshold/12}$$

Figure 30:
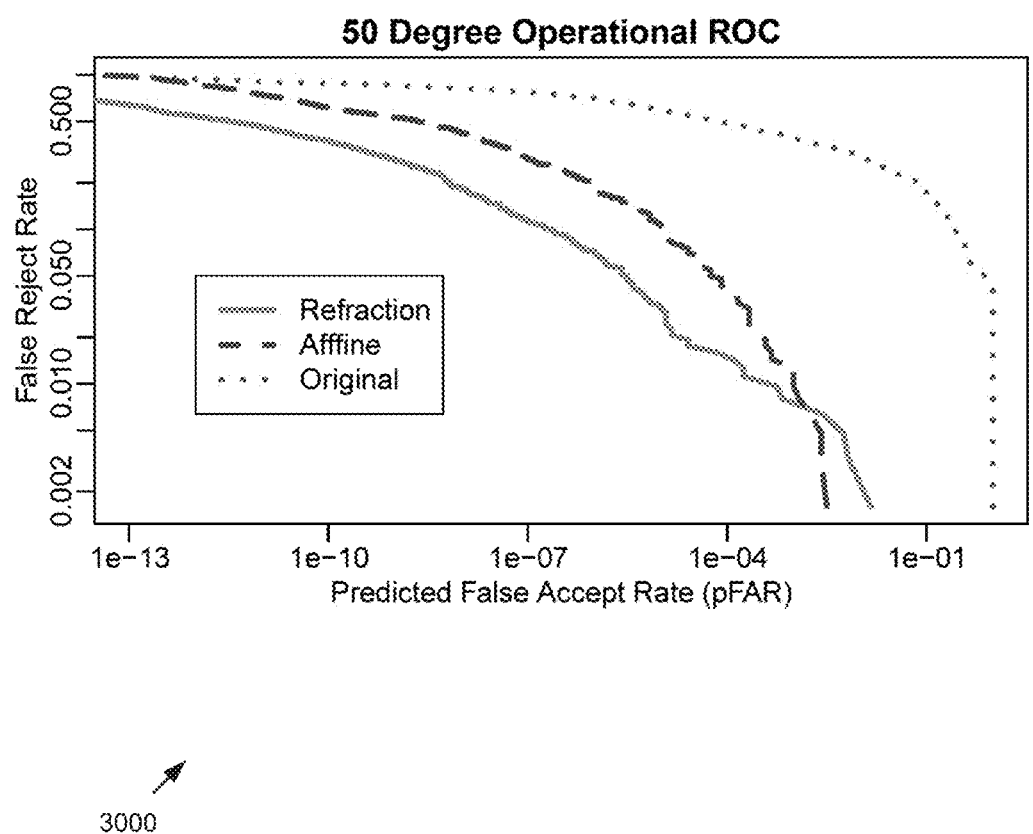
FIG. 30 is a plot of Estimated ROC based on predicted False Accept Rate using various decision thresholds.

Thus, after sorting the match score distributions in increasing order, one can consider each score in the sorted distribution as the matching decision threshold. For the decision threshold, one can calculate the predicted false accept rate by the equation immediately above and the false reject rate (ERR) from the match score distribution. Such an approach allows for the consideration of the false reject performance at much higher false accept rates than the non-match distributions themselves would allow. The estimated ROC plot 3000 generated in this manner is shown in FIG. 30.

Viewing the results in this manner allows for the consideration of expected performance at operational false accept rates. For the desired false accept rates of one in one million and one in one billion, using the corneal refraction correction transformation would be expected to lower the false reject rates by 11.92% and 24.56%, respectively, than simply using an affine transformation to transform the images to a frontal view.

D. Further Information

Having established the performance improvement of the reconstructed set over both the original and affine transformation sets, the implications may be explored. The probes in each set were created from the exact same set of original images. Thus, the differences in performance must be directly attributable to differences in the transformations used to create the set.

The affine transformation rotated the images and translated the iris to be in the center of the image with a frontal gaze. The affine transformation improved the matching results compared with the original set. The refraction correction transformation in effect applies this same affine transformation while also accounting for corneal refraction effects. Thus, comparing the refracted results to the affine results indicates the performance improvements that may be attributed to corneal refraction correction alone in conjunction with VeriEye.

Example 42

Exemplary Transforms Adjusting Images to Frontal View: Findings

The generalized eye model improved match score distribution by up to 146%. Improvements are inherent to the correcting for the refraction of the cornea.

From the ROC curve at predicted false accept rates, one would anticipate a false reject rate drop of 24.56% at a one in one billion false accept rate.

Example 43

Exemplary Further Implementations

Non-frontal iris images present a challenge for iris recognition. A problem with non-frontal images is that the eye is a three-dimensional structure and cannot be easily transformed to align to a frontal image. Some systems assume the iris lies on a plane and under such assumptions it can be aligned to frontal images using techniques like elliptical or rubber sheet unwrapping. Such techniques are adequate for correcting angles up to 30 degrees off angle, but for larger angle images there are other effects that cause alignment problems. Iris texture can be corrected for images taken from 30 degrees to 50 degrees of angle. Thirty degrees is where simple correction methods begin to fail. At about 50 degrees, the cornea is self-occluding, which precludes accurately segmenting the far limbus boundary.

As the angle increases there are a number of physical and anatomical factors that cause distortions in the iris image and makes alignment difficult:

Cornea Refraction—As light passes through the cornea, it gets refracted. Because the iris is an approximate plane behind an approximately spherical cornea, the rays of light are bent in ways that cause the iris texture to shift in different directions and by different amounts depending on the viewpoint.

The Limbus Effect—The limbus, which is the semi-opaque outer boundary of the cornea, is slightly elevated relative to the iris plane. As a result, it may occlude different parts of the iris boundary as the viewing angle changes.

3D Iris Shape—The iris is not strictly a plane but has an approximately toroidal surface. Additionally, the iris texture is three dimensional including crypts, ridges, and contraction folds that cause the appearance of the texture to change when viewed from different angles.

Dilation and Accommodation—Dilation not only expands and contracts the pupils, but also changes the 3D thickness of the iris and distorts the iris texture. Similarly, accommodation is a process where the lens is pushed into the iris during normal focusing of the eye. It moves the center of the iris closer to the cornea, which causes additional distortion when viewed from off-angle images.

There are at least three methods for correcting off-angle iris images. The techniques can be based on transforming the iris images to appear frontal by correcting for the complex distortions caused by the cornea and 3D structure of the iris. By correcting the images, the techniques can be used to preprocess off-angle images and do not require costly modification of existing commercial systems. The three methods are based on:

1. Measuring the texture displacement from off-angle images using optical flow techniques.
2. Learning corrections using a Genetic Algorithm that optimally improve Hamming distance scores for off-angle iris images.
3. Modeling the refractive process of the cornea to compensate for optical distortions.

Although the techniques do not currently compensate for all of the challenges associated with non-frontal images, the techniques significantly improve the scores for a Daugman-like iris matcher as well as a commercial VeriEye iris matcher. The technologies allow irises to be accurately matched at angles up to 50 degrees.

Example 44

Exemplary Further Implementations: Off-Angle Correction Techniques

Three techniques for the correction of off-angle iris images are described. The techniques can be labeled:

1. Measured: measuring the displacements of the iris texture using optical flow.
2. Genetic Algorithm: finding optimal displacement mappings that minimize the Hamming distances between frontal and off-angle images.
3. Refractive: modeling the cornea refraction using ray tracing.

The three techniques are used as a preprocessing step that corrects the iris image such that it appears frontal. In this way, the irises can be further processed using unmodified back end matchers. The work can be tested using the Neurotechnology VeriEye matcher. Although the VeriEye algorithm is robust to off-angle images, the techniques further improve VeriEye scores and extend the useable range of the algorithm out to 50 degrees off-angle.

The techniques can be compared to two other preprocessing techniques that represent baseline performance. The first leaves the image unmodified. VeriEye has some tolerance to non-frontal images, so this benchmark represents the performance of the algorithm if no correction is applied to the images.

VeriEye had difficulty segmenting the iris images as the angle neared 50 degrees. So, a simple affine correction was implemented that serves as the other baseline. The affine correction makes the iris appear frontal by adjusting the pupil boundary to appear approximately circular. The adjustment effectively compensates for perspective distortions assuming a planer iris, but it will not correct for cornea refraction or other non-linear distortions. The affine correction can serve as a good stand-in for most elliptical or rubber sheet unwrapping techniques. It also corrects the appearance of the iris so that VeriEye has no issues segmenting the off-angle images.

Example 45

Exemplary Further Implementations: Affine Correction

The affine correction was designed to operate with some of the more difficult iris images and is used for preprocessing for the Measured and Genetic Algorithm corrective techniques. Some iris recognition algorithms assume that the eye is facing approximately frontal and the pupil and limbus boundaries are approximately circular. For off-angle images the boundaries are elliptical, and sometimes much of the boundary is not visible due to occlusion from the eye lids.

The portions of the iris that are visible vary depending not only upon the eye gaze direction, but also the face gaze direction. When the face gaze direction is different from the eye gaze direction, portions of the iris can become occluded by the left and right portions of the eye socket. When the face and eye gaze concur, this issue does not arise. However, when the eye gaze and face gaze are different, a portion of the iris can become occluded.

In the high definition camera laboratory setup, the person's head and eyes have the same gaze simplifying the problem. However, for some of the commercial sensors, the camera is positioned directly in front of the person's head, and then the person is asked to look to the left and right to obtain off-angle data. The differences between these collections can occur when an image is collected by the laboratory setup versus being collected using a commercial sensor. A similar issue exists when the eye gaze is shifted away from the nose so that the other corner of the eyelids occludes the limbus boundary.

Because large portions of the limbus boundary are often occluded, a technique can geometrically normalize an image based only on the pupil boundary and the iris width. The technique applies an affine transformation to the iris that causes the pupil to appear circular and centered in a 640×640 image, while the limbus is scaled to have a fixed width (e.g., 512 pixels or the like). Because only the limbus width is constrained, it eliminates the need to segment the entire limbus boundary. Both sides of the limbus boundary may not be available, so the technique can be extended to better handle such cases. The method described below is adequate for the test set used in the research.

To determine the affine transformation the following steps can be applied:

1. The iris is first automatically segmented. The segmentation provides a good estimate of the pupil and limbus boundaries. For testing purposes, automatic segmentations can be corrected manually to insure that the ellipses fit to the boundaries are accurate.

2. Ellipses are fit to the boundaries of the pupil and iris (see, e.g., Fitzgibbon et al., "Direct least square fitting of ellipses," *IEEE Transactions on Pattern Analysis and Machine Intelligence*, vol. 21, no. 5, pp. 476-480, May 1999), providing parameters for the ellipse which include the x and y center point, a major and minor axis, and a rotation angle.

3. Four control points for the transformation are defined as the end points of the major and minor axes. To correct the pupil to appear circular, an affine transformation is computed that translates the center of the ellipse to the center of the 640×640 image and rescales the major and minor axis to have equal length. The orientation of those axes is preserved so that there is no rotation of the iris texture due to the transformation.

4. After the axis have been stretched so that the pupil is circular, an additional uniform scaling is applied such that the limbus boundary is 512 pixels across.

Example 46

Exemplary Further Implementations: Measuring Displacements

To better understand distortions produced by off-angle cornea detractions, a technique was developed to measure the distortions directly from images of irises. The idea is to associate points from the off-angle images with points on the frontal images. This provides a mapping from the off-angle to frontal images which can be analyzed to better understand how the texture of the iris is distorted as the pose of the eye changes.

Optical flow techniques can assume that the two images being compared only have small displacements between their texture patterns. In the original images, however, there are large displacements between the iris patterns because the irises are often centered in different places in the image and the rotation angles make off angle irises appear elliptical instead of circular. Much of this can be corrected by first applying the affine transformation described above. Doing this aligns the irises to the center of the image and results in an iris pattern that is much closer to circular.

After the affine transformation, the irises are centered, stretched, and scaled, but differences in the dilation levels of the iris can still cause large texture misalignments in the images. To correct, the image is radially stretched such that a ring 256 pixels from the center of the image does not move, but the pixels near the center of the image are artificially dilated or contracted such that the pupil is a circle of radius 80. After dilation correction, it is estimated that the texture translates by at most 15 pixels for most of the off-angle images.

After the iris textures are aligned, a number of techniques can be used to compute optical flow associations between the off-angle and frontal textures. These include Lucas Kenade Tracking, Farneback optical flow algorithm, and Minimum Output Sum of Squared Error (MOSSE) correlation filter tracking MOSSE filters produced the best results because MOSSE filters were more sensitive to the low contrast iris texture. In addition, MOSSE tracking also produces a quality score based on the peak-to-side lobe ratio that was used drop many erroneous point associations from the dataset.

Figure 31:
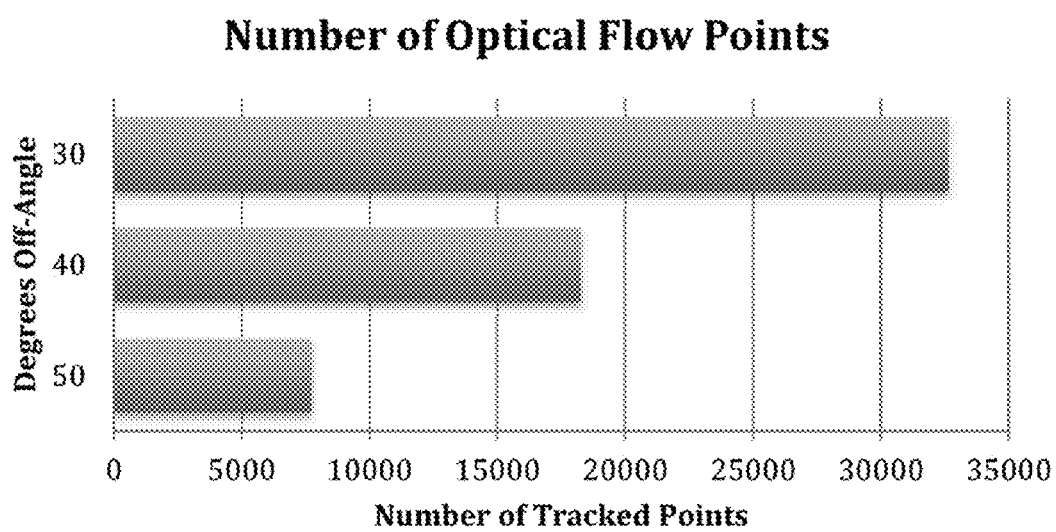
FIG. 31 is a plot of number of optical flow points for different degrees off-angle.

FIG. 31 shows the number of points tracked for each partition of the dataset. The plot shows that as the angle increases, it is harder to produce good associations between images, and therefore the number of traced points drops. In order to best represent the local effects of the cornea, point associations are translated back to the dilation level of the frontal image. Each of the tracked points provides a measurement of how much the local region in the normalized off-angle image should be corrected in order to align the iris texture.

The next step of the process is to produce a general distortion mapping that can be applied to most images at a particular angle to improve the texture alignment. Essentially, this means to compute an average distortion map from the point associations computed between the paired images. The technique used for the process represents the distortion map using a weighted sum of Radial Basis Function (RBF). The RBFs can be two-dimensional Gaussian functions laid out in a grid in the normalized iris image with a spacing of 40 pixels and a sigma of 40 pixels. For each pixel location in the distortion map, the weights of the RBF's can be rescaled to sum to 1.0. Finally, a least squares regression can be run to determine a best least squared fit to the point association data. Once the approximation to the distortion map is generated, it is used to generate a dense look-up table that remaps the off-angle images to frontal.

Figure 32A:
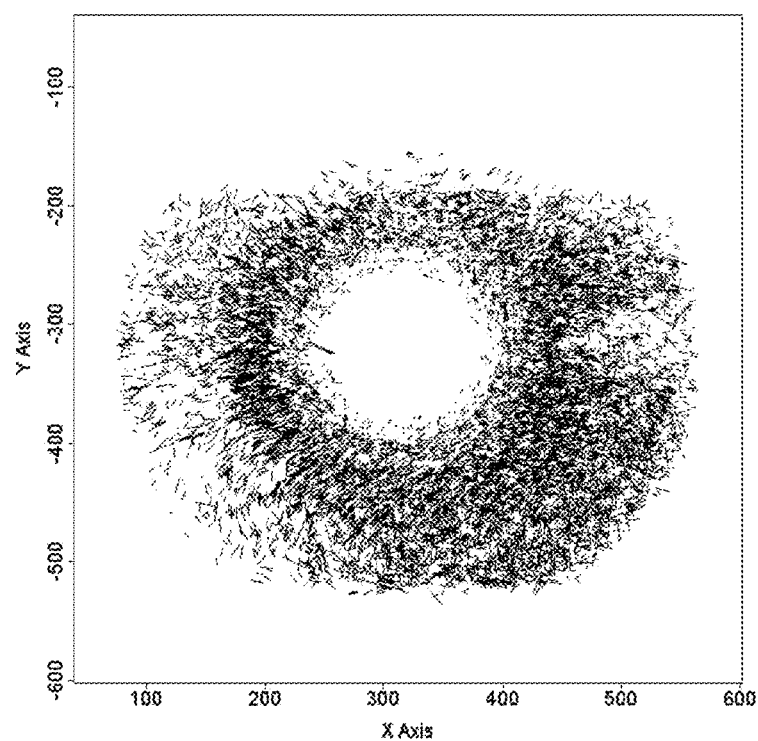
FIGS. 32A-B show pixel values used to compute distortion mapping and approximate distortion map.
Figure 32B:
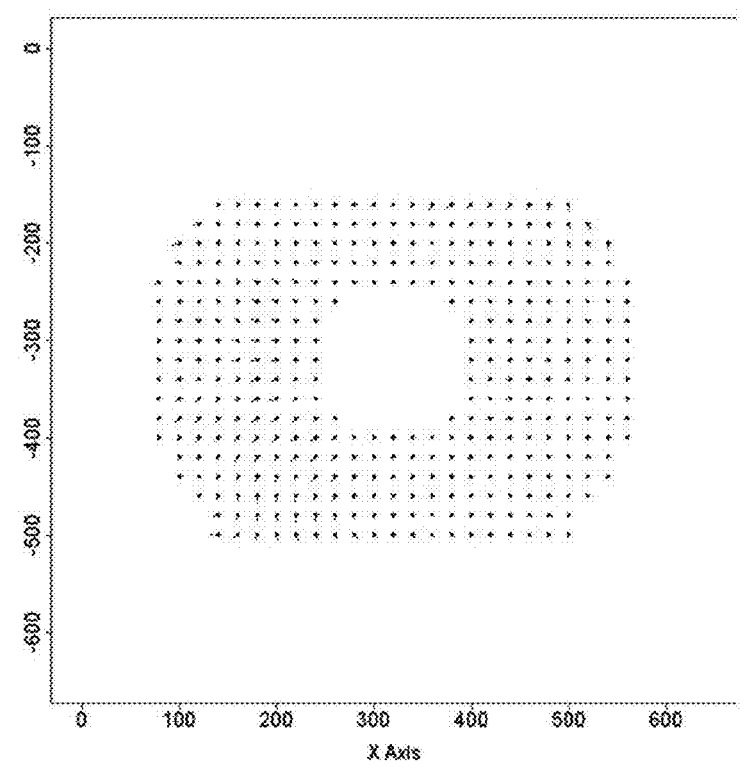

FIG. 32A shows the associated pixel values used to compute a distortion mapping. FIG. 32B shows the approximate distortion map using the RBF projection to average the data.

Example 47

Exemplary Further Implementations: Genetic Algorithm Optimization

As an alternative to measuring displacements between the off-angle and frontal images, it is possible to evaluate look-up tables based on how they affect the Hamming distances produced between the two images. A genetic algorithm can be used to optimize look-up tables (LUTs) to produce improved Hamming distance scores for the off-angle images.

For training the same images of the 25 subjects that were used for testing can be used; however, to control for over fitting, three-fold cross validation was used. The 25 subjects were partitioned into three groups. For each of three tests, one partition was used as a testing set while the other two partitions were used for the genetic algorithm optimization process. This resulted in 3 LUTs that were computed for different angles: 30 degrees, 40 degrees, and 50 degrees.

Like the Measured technique, the genetic algorithm (GA) starts out using the same 640×640 affine corrected images. The LUT transform is based on a 9×9 grid of 81 control points. Each control point has an x and y displacement for a total of 162 parameters that are optimized by the GA. The GA tunes these parameters in order to make corrections for the cornea refraction and other distortions, which misalign the iris texture.

The fitness function that is optimized can be based on a Daugman-like iris recognition algorithm. For each subject in the training set, there are 5 frontal images and 5 off-angle images. The recognition algorithm converts the unmodified frontal images and corrected off-angle images into an iris bit code by convolving the unwrapped irises with Gabor wavelets at three scales and then thresholding the results. The final fitness function value is the average Hamming distance between the frontal and off-angle images.

The genetic algorithm can be based on the GENITOR algorithm (e.g., see Whitley et al., "GENITOR II: A Distributed Genetic Algorithm," *Journal of Experimental and Theoretical Artificial Intelligence*, vol. 2, no. 3, pp. 189-214, 1990) and the specific implementation can come from the PyVision library of the Computer Vision Toolkit. The GENITOR algorithm used a population where only the best 100 individuals were retained in the population. This applies more evolutionary pressure than traditional algorithms and can result in faster convergence. The population was initialized with control points that had only small displacements relative to the affine correction. Therefore the GA's initial population performed approximately as well as the Affine transformation alone.

Figure 33:
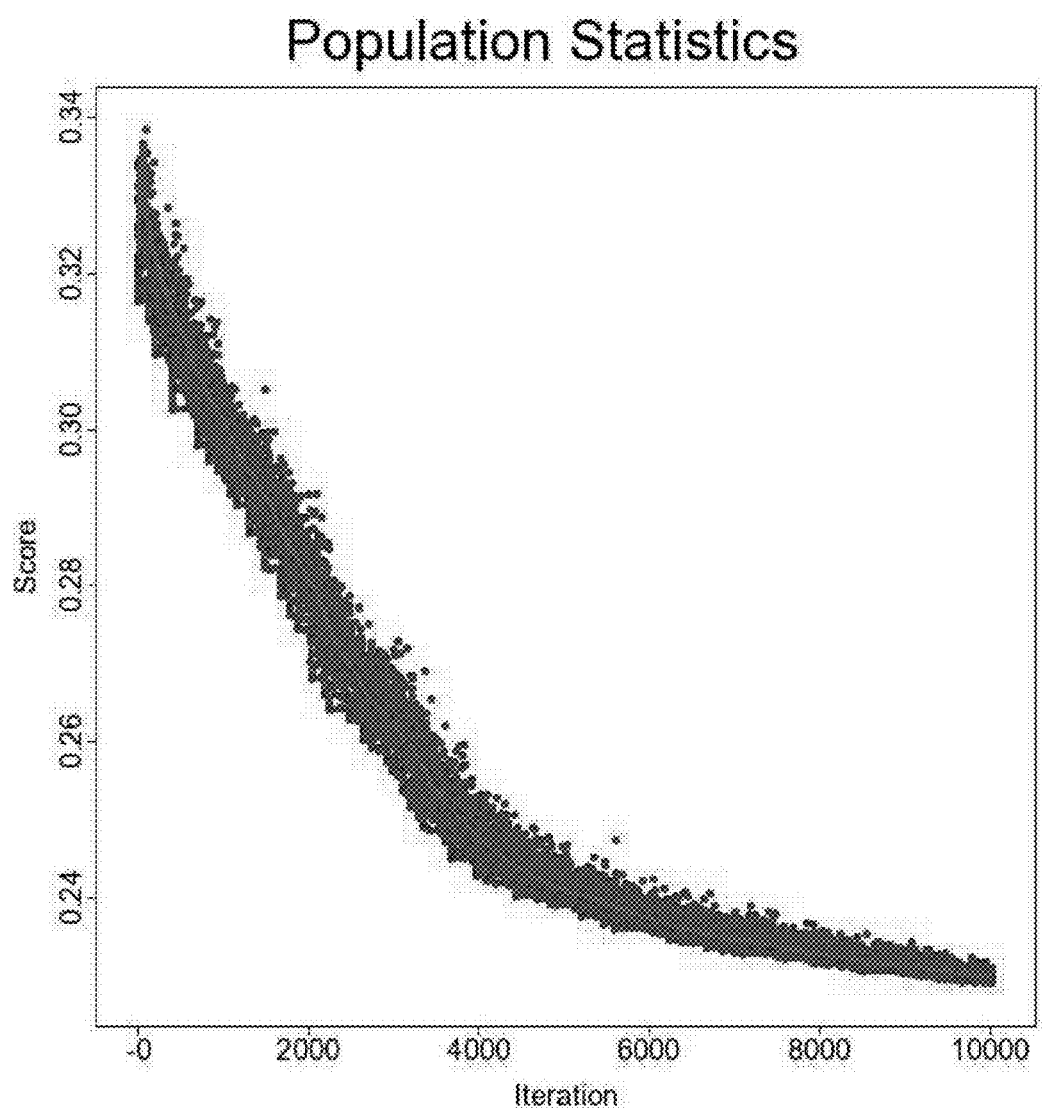
FIG. 33 is a plot showing performance score of look-up tables for iterations of a genetic algorithm.

Each GA ran for 10000 iterations where an iteration is one fitness function evaluation. FIG. 33 the convergence of the GA for 50 degrees off-angle images where the average Hamming distance was reduced from about 0.33 to 0.23. In the results, the dots represent each fitness function evaluation. The bottom line represents the best individual in the population and the middle line is the worst individual in the population at each time step. The fitnesses of individuals were evaluated in parallel on a 64 core machine, where each of the 9 GA runs completed after approximately 17 hours.

Figure 34A:
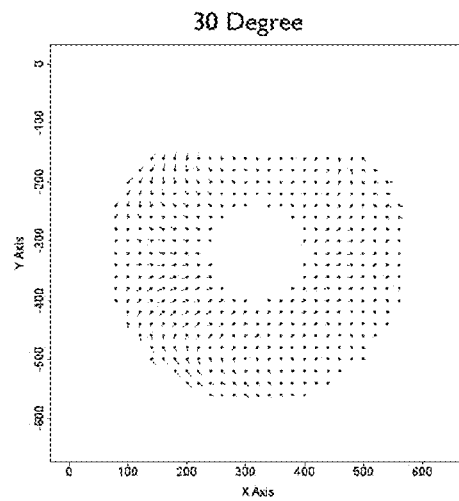
FIGS. 34A-C show look-up tables produced by a genetic algorithm.
Figure 34B:
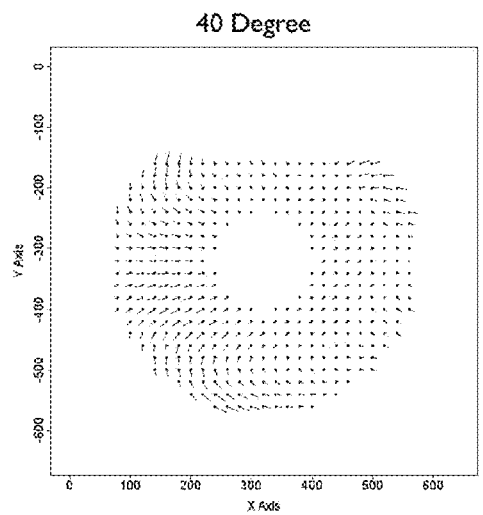
Figure 34C:
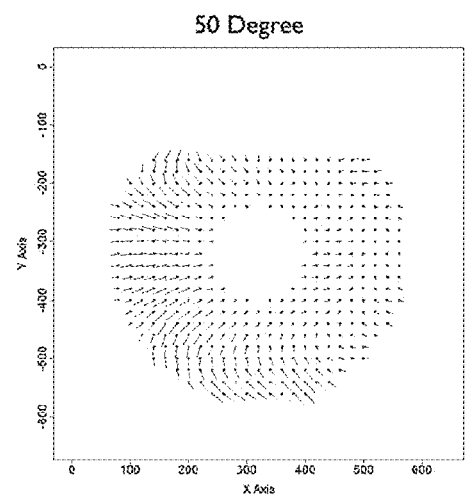

Three of the LUTs are shown in FIGS. 34A-C for 30 degrees, 40 degrees, and 50 degrees, where the left side of the LUTs correspond to the part of the eye that is furthest from the camera and needs the most correction. It can be seen that as the angle increases, so does the magnitude of the correction, while the direction of the corrections remain mostly unchanged. The distortion becomes stronger as the angle increases.

Example 48

Exemplary Further Implementations: Refractive Eye Model

Another technique to correct for off-angle distortion models the refractive properties of the cornea and uses ray tracing to correct for corneal refraction and to render a corrected frontal view of the off-angle irises. The ORNL eye model can be used. The eye model includes a carefully constructed model of the cornea and iris geometry.

The model used includes a quadratic surface for the anterior cornea (e.g., see Navarro et al., "Optics of the average normal cornea from general and canonical representations of its surface topography," *J. Opt. Soc. Am. A*, 23(2):219-232, February 2006; and others). The posterior cornea can be a sphere (e.g., see the Gullstrand-LeGrand model by Le Grand, *Form and Space Vision*, Indiana University Press, 1967 and others). The cornea thickness can be 0.5 mm at the apex. An index of refraction of 1.36 was used for the cornea, and 1.33 was used for the aqueous humour. The iris can be modeled as a plane with an anterior corneal depth of 3.6 mm. The iris can be tilted slightly outward at an angle of 2.5 degrees. The limbus can extend along the cornea up to 0.5 mm above the cornea.

To transform an image from non-frontal to frontal using the eye model, the limbus boundary can be aligned to the limbus of the three-dimensional model. The camera parameters and the eye model location can be adjusted to match a laboratory setup for testing. To improve performance, an approximate laboratory setup was replicated in the 3D geometry of the ray tracer. The camera had a focal length of 150 mm, and it was located 340 mm from the eye. The off-angle eye was rendered in the center of the image and then an affine transformation was used to transform the limbus of the original off-angle image to align to the limbus in the ray traced image.

The eye model was originally designed using POV-Ray. The projection process involves first tracing the rays from the camera, through the cornea to the iris plane for the off-angle image. This creates a texture for the iris plane. The eye model and camera geometry is then modified to a frontal configuration and a frontal view of the eye is then rendered using the newly created iris plane texture. The result is a view of the iris as it would appear in a frontal image. The iris plane can be extended past beyond the cornea so that the texture includes the ocular region. When corrected to frontal, the ocular region is corrected with a perspective transformation; while the iris, which is within the cornea bubble, includes additional correction for optical refraction. The resulting image looks like a frontal image of an eye, which is easily segmented by the iris matcher.

Example 49

Exemplary Further Implementations: Results

A. Dataset

For the dataset, a set of iris images can be used that are taken of the left eye of 25 subjects at six angles ranging from 50 degrees to the left of the subject to frontal (0 degrees). For collection, the subjects were asked to sit in a chair and place their face in a chin rest with forehead support to reduce head motion. The subject is asked to remain steady and not change their gaze during data capture. The camera, which was mounted on a robotic arm with a radius of 50 cm, moved from left to right collecting images. Five images were collected at 6 angles that were separated by 10 degree increments. This resulted in a dataset of 30 images for each subject, for a total of 750 images.

The images were collected using a Toshiba Teli CleverDragon series camera with a focal length of 150 mm. The camera features a 12M (4096×3072) monochrome CMOS sensor with NIR sensitivity. The size of the captured irises ranged from 750 to 1000 pixels in diameter. A 720 nm longpass filter fitted to the lens blocks ambient light while allowing most of the NIR illumination to pass. For illumination, two infrared light sources were attached to both sides of the camera and were directed at the subjects' eyes.

The 750 images selected for these experiments come from a larger collection. The subjects and images used were selected because they were all high quality images without any blinks or focus problems. Dilation levels were not controlled but are typical of indoor illumination. The pupil and iris boundaries were hand segmented to avoid any complications with automatic segmentation. As a result of the selection process, images in the data set should be easily matched except for complications due to angle.

The techniques correct the iris texture for off-angle effects. One of the most notable effects of off-angle iris images is that the limbus and pupil boundaries that are approximately circular when viewed from the front, become increasingly elliptical as the angle becomes more extreme.

B. Iris Matching

Iris matching can be performed using the commercial VeriEye 2.5 technology from the Neurotech SDK. VeriEye is a complete iris recognition system that includes detection, segmentation, and matching capabilities. Although the algorithm details are unknown, VeriEye's product literature claims the system is robust to common issues with iris quality including off-angle images. It was verified that VeriEye performs well on the unmodified test dataset and produces high match scores for most images in the testing set including images in the 30 degree and 40 degree partitions. The unmodified 50 degree images cause significant issues for VeriEye, and it is clear that many of the failures are caused by difficulty in segmentation.

Figure 35A:
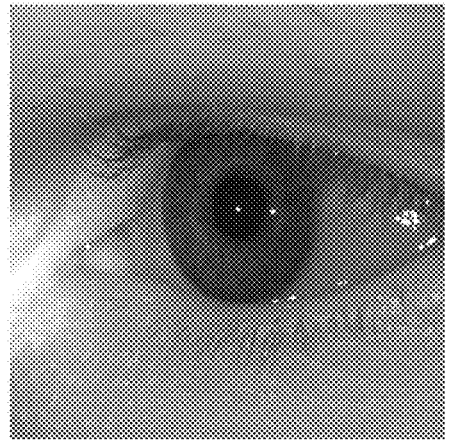
FIGS. 35A-D show an original image and the results of various processing techniques.
Figure 35B:
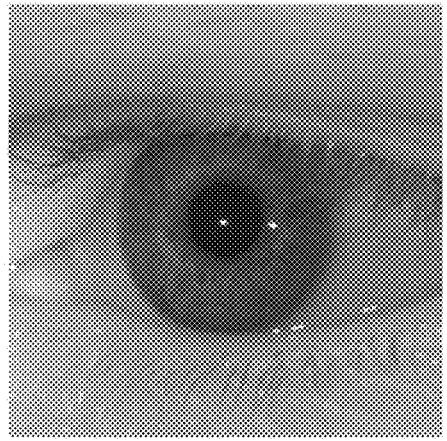
Figure 35C:
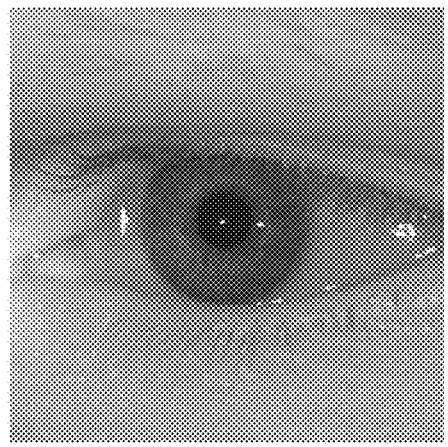
Figure 35D:
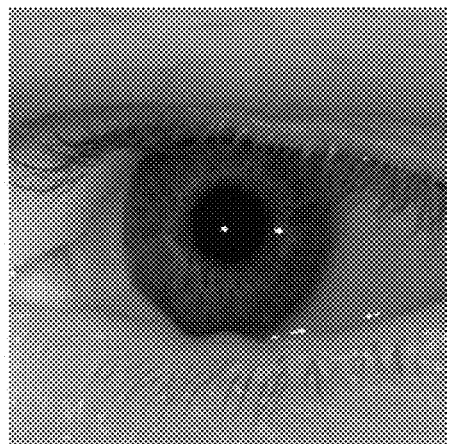

To test the correction techniques, images that have been preprocessed using the techniques are given to the VeriEye SDK. VeriEye computes similarity scores for each pair of irises, where irises that have higher scores indicate a better match. Examples of the images used for testing are shown in FIGS. 35A-D. FIG. 35A is an original image. The other three are based on the original. FIG. 35B is generated via an affine transform. FIG. 35C is generated using the ORNL eye model, and FIG. 35D is generated via the genetic algorithm.

As can be seen the Affine, Refracted, and Genetic Algorithm methods appear approximately frontal. There are also less noticeable corrections in the Refracted and Genetic Algorithm images that account for effects like cornea refraction. There are also noticeable distortions near the top and bottom eyelids in the Genetic Algorithm image that are somewhat random. The distorted regions can be masked out in the fitness function computation and have little effect on iris matching.

C. Distribution Box Plots

Figure 36:
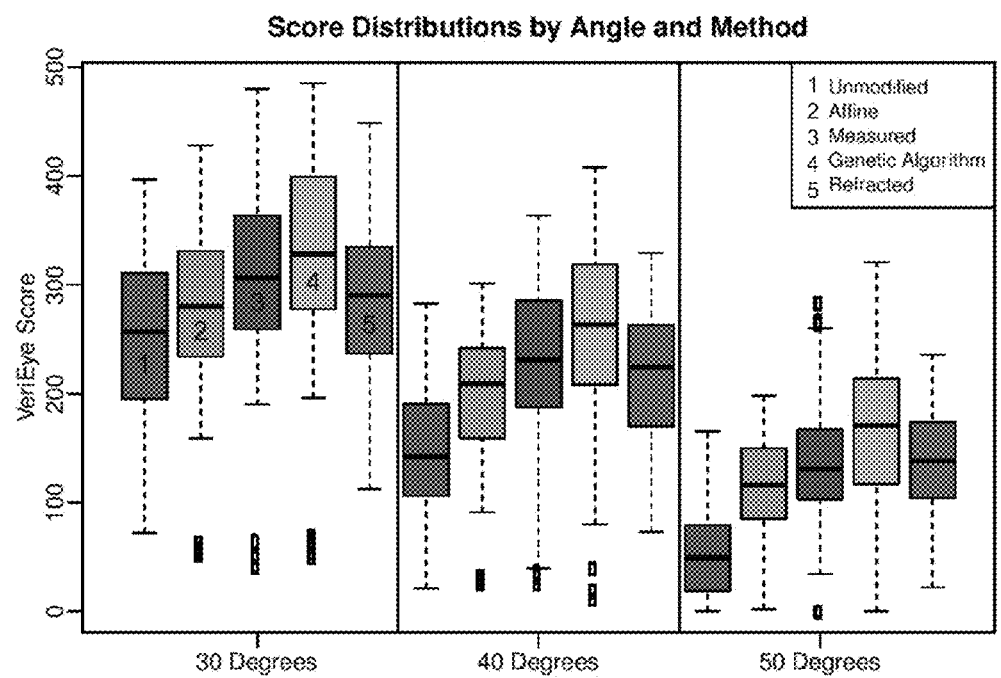
FIG. 36 is a plot showing score distributions by angle and technique.

The plot shown in FIG. 36 compares the score distributions of the three different data sets when tested using five preprocessing techniques using the VeriEye matcher. In the plot, higher scores are better. "Unmodified" is the distribution of scores when VeriEye is run on the unmodified images. "Affine" shows the results of correcting the off-angle images using a simple affine transformation. Improvement is probably mostly due to improved segmentation. "Measured" shows the results of using corrective look-up tables computed from optical flow results. "Genetic Algorithm" is identical to the "Measured" correction method but uses look-up tables that optimize Hamming distance. "Refracted" used ray tracing to correct for cornea effects.

Different views of the data show that they are correctly verified using the techniques that would have failed using the unmodified images.

D. ROC Curves

Figure 37:
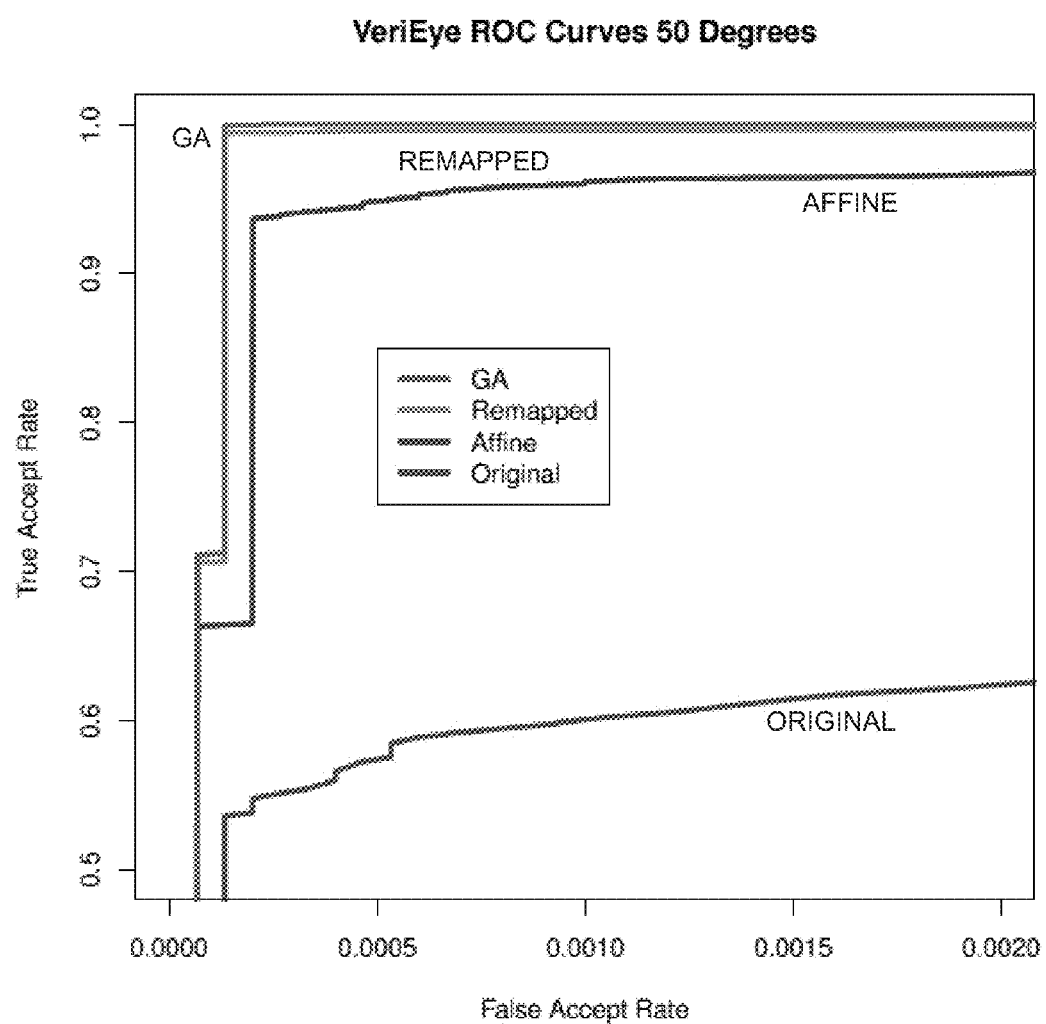
FIG. 37 is a plot showing ROC curves for a 50 degree off-angle image.

FIG. 37 is a plot showing ROC curves for a 50 degree off-angle image.

Example 50

Exemplary Applications

The technologies herein can be applied to any of a wide variety of applications in which iris recognition can be used, including access to a secure facility, access to the home, access to personal information, identification of a person of interest, helping law enforcement identify individuals, identify clients to offer products, and the like.

Example 51

Exemplary Additional Features

The technologies can be applied in an active use case where ray tracing can be done at recognition time.

A. The method of claim 1 wherein:
the reconstructing comprises tracing rays from an off-angle iris to a synthetic iris.

B. The method of claim A wherein:
the reconstructing comprises tracing rays from the synthetic iris to a sensor in a frontal position with respect to the synthetic iris.

C. The method of claim 1 wherein:
reconstructing a frontal view image of the iris comprises generating a synthetic iris modeled without refraction.

D. The method of claim 1 wherein:
the reconstructing comprises tracing rays via an eye model with aspheric eye dimensions.

E. The method of claim 1 wherein:
the reconstructing comprises tracing rays via an eye model with cornea characteristics.

F. The method of claim 1 wherein:
the reconstructing comprises tracing rays via an eye model with aqueous humor characteristics.

G. The method of claim 1 wherein:
the reconstructing comprises tracing rays via an eye model with iris characteristics.

Example 52

Exemplary Computing Systems

Figure 38:
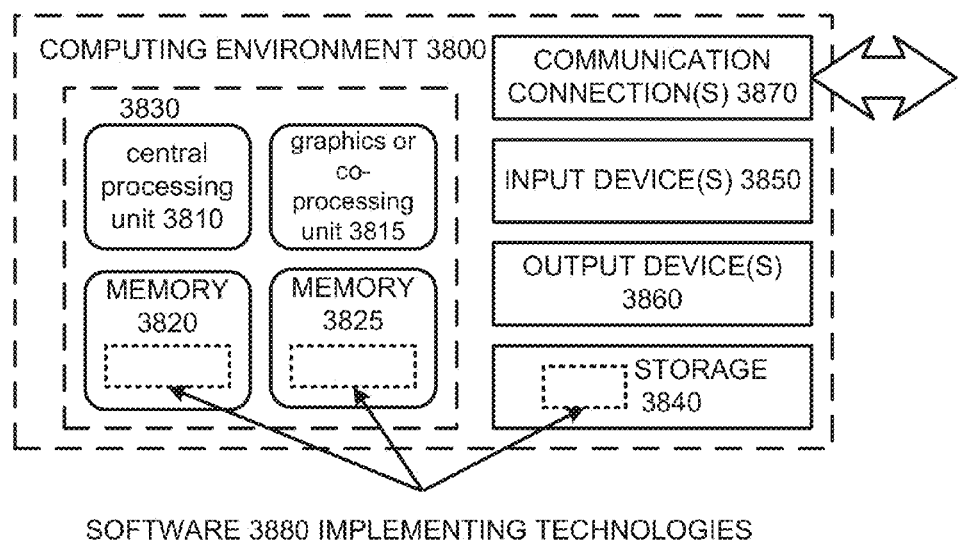
FIG. 38 is a diagram of an exemplary computing system in which described embodiments can be implemented.
Figure 39:
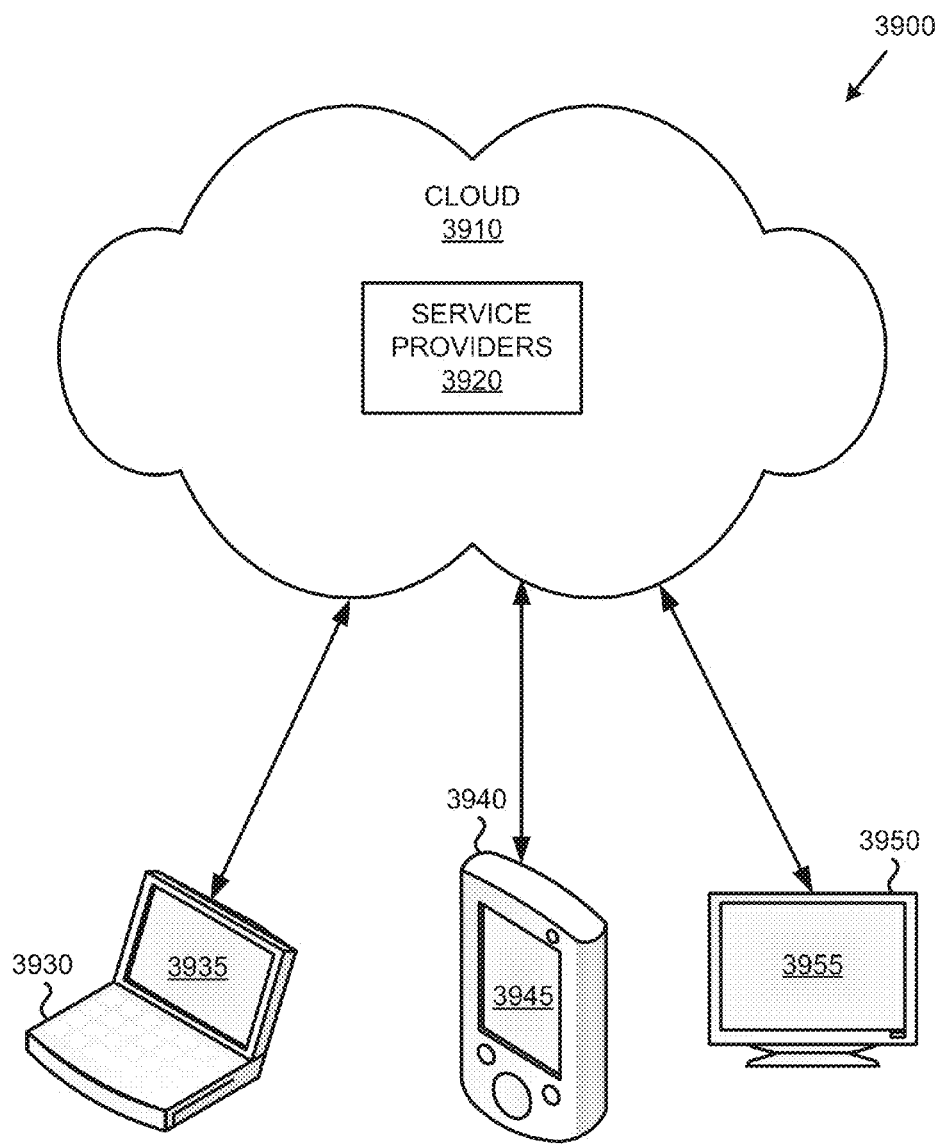
FIG. 39 is an exemplary cloud-support environment that can be used in conjunction with the technologies described herein.

FIG. 38 illustrates a generalized example of a suitable computing system 3800 in which several of the described innovations may be implemented. The computing system 3800 is not intended to suggest any limitation as to scope of use or functionality, as the innovations may be implemented in diverse general-purpose or special-purpose computing systems.

The technologies can also be implemented in specialized hardware (e.g., an iris-recognition appliance) that can contain additional elements (e.g., a high definition camera or the like).

With reference to FIG. 38, the computing system 3800 includes one or more processing units 3810, 3815 and memory 3820, 3825. In FIG. 38, this basic configuration 3830 is included within a dashed line. The processing units 3810, 3815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 38 shows a central processing unit 3810 as well as a graphics processing unit or co-processing unit 3815. The tangible memory 3820, 3825 may be volatile memory (e.g., registers, cache, RAM), non-volatile memory (e.g., ROM, EEPROM, flash memory, etc.), or some combination of the two, accessible by the processing unit(s). The memory 3820, 3825 stores software 3880 implementing one or more innovations described herein, in the form of computer-executable instructions suitable for execution by the processing unit(s).

A computing system may have additional features. For example, the computing system 3800 includes storage 3840, one or more input devices 3850, one or more output devices 3860, and one or more communication connections 3870. An interconnection mechanism (not shown) such as a bus, controller, or network interconnects the components of the computing system 3800. Typically, operating system software (not shown) provides an operating environment for other software executing in the computing system 3800, and coordinates activities of the components of the computing system 3800.

The tangible storage 3840 may be removable or non-removable, and includes magnetic disks, magnetic tapes or cassettes, CD-ROMs, DVDs, or any other medium which can be used to store information in a non-transitory way and which can be accessed within the computing system 3800. The storage 3840 stores instructions for the software 3880 implementing one or more innovations described herein.

The input device(s) 3850 may be a touch input device such as a keyboard, mouse, pen, or trackball, a voice input device, a scanning device, or another device that provides input to the computing system 3800. For video encoding, the input device(s) 3850 may be a camera, video card, TV tuner card, or similar device that accepts video input in analog or digital form, or a CD-ROM or CD-RW that reads video samples into the computing system 3800. The output device(s) 3860 may be a display, printer, speaker, CD-writer, or another device that provides output from the computing system 3800.

The communication connection(s) 3870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 53

Exemplary Cloud-Supported Environment

In example environment 3900, the cloud 3910 provides services for connected devices 3930, 3940, 3950 with a variety of screen capabilities. Connected device 3930 represents a device with a computer screen 3935 (e.g., a mid-size screen). For example, connected device 3930 could be a personal computer such as desktop computer, laptop, notebook, netbook, or the like. Connected device 3940 represents a device with a mobile device screen 3945 (e.g., a small-size screen). For example, connected device 3940 could be a mobile phone, smart phone, personal digital assistant, tablet computer, and the like. Connected device 3950 represents a device with a large screen 3955. For example, connected device 3950 could be a television screen (e.g., a smart television) or another device connected to a television (e.g., a set-top box or gaming console) or the like. One or more of the connected devices 3930, 3940, 3950 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 3900. For example, the cloud 3910 can provide services for one or more computers (e.g., server computers) without displays.

Services can be provided by the cloud 3910 through service providers 3920, or through other providers of online services (not depicted). For example, cloud services can be customized to the screen size, display capability, and/or touch screen capability of a particular connected device (e.g., connected devices 3930, 3940, 3950).

In example environment 3900, the cloud 3910 provides the technologies and solutions described herein to the various connected devices 3930, 3940, 3950 using, at least in part, the service providers 3920. For example, the service providers 3920 can provide a centralized solution for various cloud-based services. The service providers 3920 can manage service subscriptions for users and/or devices (e.g., for the connected devices 3930, 3940, 3950 and/or their respective users).

Example 54

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method implemented at least in part by a computer, the method comprising:
   receiving an off-angle iris image depicting an iris with an off-angle gaze; and
   from the off-angle iris image, reconstructing a frontal view image of the iris;
   wherein the reconstructing accounts for limbus effect;
   wherein the reconstructing comprises applying a transform to the off-angle iris image; and
   wherein the transform comprises a transform computed from measured optical flow between pairs of off-angle and frontal iris images; or
   the transform is composed from a mapping between the off-angle iris image and an unrefracted iris; or
   the transform is composed from a mapping between an unrefracted iris and a reconstructed frontal image.

2. One or more non-transitory computer-readable media comprising computer-executable instructions causing a computing system to perform a method comprising:
   receiving an off-angle iris image depicting an iris with an off-angle gaze; and
   from the off-angle iris image, reconstructing a frontal view image of the iris;
   wherein the reconstructing accounts for limbus effect;
   wherein the reconstructing comprises applying a transform to the off-angle iris image; and
   wherein the transform comprises a transform computed from measured optical flow between pairs of off-angle and frontal iris images; or
   the transform is composed from a mapping between the off-angle iris image and an unrefracted iris; or
   the transform is composed from a mapping between an unrefracted iris and a reconstructed frontal image.

3. The method of claim 1 wherein:
   the reconstructing is performed as image preprocessing before submission to iris recognition logic.

4. The method of claim 1 wherein:
   the reconstructing comprises removing a portion of the off-angle iris image occluded by a limbus due to a frontal view.

5. The method of claim 4 further comprising:
   modeling a physical location of the limbus.

6. The method of claim 1 further comprising:
   indicating that a portion of the frontal view image of the iris is to be masked from consideration during iris recognition, due to limbus occlusion.

7. The method of claim 1 further comprising:
   performing segmentation of the iris, wherein the segmentation is based on modeled occlusion by the limbus.

8. The method of claim 7 further comprising:
   unwrapping an image of the iris based on the segmented iris.

9. The method of claim 1 wherein:
   the off-angle gaze is more than 30 degrees off-angle away from frontal.

10. One or more non-transitory computer-readable media comprising computer-executable instructions causing a computing system to perform a method of converting an off-angle iris image to an estimated frontal view iris image, the method comprising:
    receiving the off-angle iris image, wherein the off-angle iris image comprises a depiction of an iris having an off-angle gaze;
    aligning the depiction of the iris with a location and shape of an eye model;
    scaling the depiction of the iris according to the eye model; and
    applying a transform to the off-angle iris image, wherein the transform is composed from mappings comprising:
    (1) a mapping between the off-angle iris image and an unrefracted iris based on the eye model; and
    (2) a mapping between an unrefracted iris and a reconstructed frontal image based on the eye model;
    wherein the eye model has an aspherical shape, models effects of limbus occlusion, and models effects of corneal refraction.

11. The method of claim 1 wherein:
    the transform maps pixels from the off-angle iris image to an image of a frontal view of the iris.

12. The method of claim 1 wherein:
    the transform comprises a precomputed transform; and
    the method further comprises:
    choosing the precomputed transform based on a gaze angle of the off-angle gaze.

13. The method of claim 1 wherein:
    the transform comprises a transform computed from modeling anatomy of an eye and is computed via ray tracing.

14. One or more non-transitory computer-readable media comprising computer-executable instructions causing a computing system to perform a method of converting an off-angle iris image to an estimated frontal view iris image, the method comprising:
    receiving the off-angle iris image, wherein the off-angle iris image comprises a depiction of an iris observed at an off-angle perspective;
    constructing a synthetic iris estimating the observed iris, wherein the constructing is based at least on the off-angle iris image, an estimation of an off angle, and an aspherical eye model modeling effects of limbus occlusion; and
    generating an estimated frontal view iris image, wherein the generating comprises observing the synthetic iris with a synthetic camera placed at a frontal view position with respect to the synthetic iris, and modeling effects of corneal refraction;
    wherein the method comprises applying a transform to the off-angle iris image, and the transform is composed from a mapping between the off-angle iris image and an unrefracted iris.

15. The method of claim 1 wherein:
    the transform comprises a transform computed via a genetic algorithm producing a look-up table.

16. The method of claim 1 wherein:
    the transform is based on an aspherical eye model.

17. The method of claim 1 wherein:
    the transform models corneal refraction.

18. The method of claim 1 further comprising:
    modeling corneal refraction in the frontal view image of the iris.

19. The method of claim 1 wherein:
    the reconstructing comprises applying a distortion map based on an angle for the off-angle gaze.

20. The method of claim 19 further comprising:
    generating the distortion map based on image pairs of respective irises at off-angle and frontal perspectives.

21. The method of claim 19 further comprising:
    generating the distortion map based on a genetic algorithm operating on affine-corrected off-angle images.

* * * * *